US008849771B2

(12) United States Patent
Berg-Sonne

(10) Patent No.: US 8,849,771 B2
(45) Date of Patent: Sep. 30, 2014

(54) RULES ENGINE WITH DATABASE TRIGGERING

(76) Inventor: Anker Berg-Sonne, Stow, MA (US)

(*) Notice: Subject to any disclaimer, the term of this patent is extended or adjusted under 35 U.S.C. 154(b) by 73 days.

(21) Appl. No.: 13/225,402

(22) Filed: Sep. 2, 2011

(65) Prior Publication Data

US 2012/0143810 A1   Jun. 7, 2012

Related U.S. Application Data

(60) Provisional application No. 61/379,714, filed on Sep. 2, 2010, provisional application No. 61/379,715, filed on Sep. 2, 2010, provisional application No. 61/409,532, filed on Nov. 2, 2010.

(51) Int. Cl.
*G06F 17/30* (2006.01)
*G05B 15/02* (2006.01)
*H02J 3/00* (2006.01)
*H02J 3/14* (2006.01)

(52) U.S. Cl.
CPC ............. *G05B 15/02* (2013.01); *Y04S 10/54* (2013.01); *H02J 2003/003* (2013.01); *H02J 3/14* (2013.01)
USPC ........................................ 707/687; 707/694

(58) Field of Classification Search
USPC ................................. 707/687, 694
See application file for complete search history.

(56) References Cited

U.S. PATENT DOCUMENTS

| | | | |
|---|---|---|---|
| 6,466,935 B1 | 10/2002 | Stuart | |
| 7,133,880 B1 * | 11/2006 | Nori et al. | 1/1 |
| 7,392,053 B1 * | 6/2008 | Conner et al. | 455/445 |
| 7,924,212 B2 * | 4/2011 | Benitez et al. | 342/28 |
| 8,020,574 B2 * | 9/2011 | Ohmi et al. | 137/12 |
| 8,219,365 B2 * | 7/2012 | Allen et al. | 703/2 |
| 8,614,431 B2 * | 12/2013 | Huppi et al. | 250/559.36 |
| 8,698,727 B2 * | 4/2014 | Herz et al. | 345/102 |
| 2004/0220702 A1 | 11/2004 | Matsubara et al. | |
| 2005/0144148 A1 | 6/2005 | Hatonen et al. | |
| 2005/0149284 A1 | 7/2005 | Nathan et al. | |
| 2005/0171645 A1 | 8/2005 | Oswald et al. | |

(Continued)

FOREIGN PATENT DOCUMENTS

GB   2488896 A1   11/2008

OTHER PUBLICATIONS

Loh et al.: "Integration of a rule-based expert system with GIS through a relational database management system for forest resource management"; Computers and Electronics in Agriculture; Nov. 1, 1994; vol. II, No. 2-3, pp. 215-228 (Elsevier, Amsterdam, NL).
Medjahed et al.: "Generalization of ACID Properties"; http://www.cs.purdue.edu/homes/ake/pub/GeneralizationOfACIDProperties.pdf; Feb. 2009.

(Continued)

*Primary Examiner* — Kim Nguyen
(74) *Attorney, Agent, or Firm* — Pepper Hamilton LLP

(57) ABSTRACT

An automated facilities management system has the ability to predict occupant behavior by identifying recurring patterns in the way that people use buildings and comparing them with environmental characteristics. This technology is not limited to human behavior patterns, but extends to any mechanical systems or data points that tend to vary in recurring patterns. The data processing is carried out by rules engines triggered by relational database modifications.

14 Claims, 25 Drawing Sheets

(56) References Cited

U.S. PATENT DOCUMENTS

| | | |
|---|---|---|
| 2006/0082444 A1 | 4/2006 | Sweeney, II et al. |
| 2006/0111816 A1 | 5/2006 | Spalink et al. |
| 2006/0200435 A1 | 9/2006 | Flinn et al. |
| 2006/0235783 A1 | 10/2006 | Ryles et al. |
| 2007/0143451 A1 | 6/2007 | Huth |
| 2008/0209506 A1 | 8/2008 | Ghai et al. |
| 2010/0023174 A1 | 1/2010 | Nagata et al. |
| 2010/0025483 A1 | 2/2010 | Hoeynck et al. |
| 2010/0026479 A1 | 2/2010 | Tran |
| 2010/0153349 A1* | 6/2010 | Schroth .................. 707/693 |
| 2010/0217550 A1 | 8/2010 | Crabtree |
| 2010/0235004 A1 | 9/2010 | Thind |
| 2010/0332210 A1 | 12/2010 | Birdwell et al. |
| 2011/0081634 A1 | 4/2011 | Kurata et al. |
| 2012/0066168 A1 | 3/2012 | Fadell et al. |
| 2012/0130546 A1 | 5/2012 | Matas et al. |
| 2012/0137367 A1 | 5/2012 | Dupont et al. |

OTHER PUBLICATIONS

Aggarwal et al., A framework for projected clustering of high dimensional data streams, Proceedings of the Thirtieth International conference on Very large data bases (VLDB '04), (2004), 30:852-863. ISBN:0-12-088469-0.

Ding et al., Time weight collaborative filtering, Proceedings of the 14th ACM international conference on Information and knowledge management (CIKN '05), (2005), 485-492. ISBN:1-59593-140-6 DOI: 10.1145/1099554.1099689.

Yoon et al., A personalized music recommendation system with a time-weighted clustering, Intelligent Systems, IS'08 4th International IEEE Conference, (2008), 2:10-48. DOI: 10.1109/IS.2008.4670496.

Mozer et al., The Neurothermostat: Predictive Optimal Control of Residential Heating Systems (1995) The neural network house; An overview. in L. Niklasson & M. Boden (Eds.), Current trends in connectionism (pp. 371-380). Hillsdale, NJ Erlbaum.

\* cited by examiner

FIG. 18

RULES ENGINE WITH DATABASE TRIGGERING

RELATED APPLICATIONS

This application claims the benefit of:

U.S. Provisional Application No. 61/379,714, entitled PATTERN MATCHING FOR AUTOMATED ENERGY MANAGEMENT SYSTEM and filed on Sep. 2, 2010;

U.S. Provisional Patent Application No. 61/379,715, entitled RULES ENGINE FOR AUTOMATED ENERGY MANAGEMENT SYSTEM and filed on Sep. 2, 2010; and U.S. Provisional Patent Application No. 61/409,532, entitled SYSTEM FOR MEASURING AND MANAGING GROUP COMFORT USING OCCUPANT FEEDBACK and filed on Nov. 2, 2010.

The entire teachings of the above applications are incorporated herein by reference.

BACKGROUND

Smart Building technologies are typically employed in an effort to monitor and control elements of a building. In such systems, the various building subsystems are integrated into a network infrastructure with a common user interface. The integrated subsystems typical include mechanical and electrical equipment such as Heating, Ventilation, and Air Conditioning (HVAC), lighting, power, fire, communications, and security systems While the Smart Building interface allows a user to manage HVAC and lighting, the functions are controlled by manually entering set points. While different zones can have differing set points and differing target temperatures and lighting levels, the zones typically have a morning set point and an evening set point. After the morning set point, the thermostats and lighting controllers are set in anticipation of zone occupancy. Likewise, after the evening set point, the thermostats and lighting controller are set in anticipation of the zone being unoccupied. The settings are usually dictated by building management to reflect standard work hours.

While weekdays, weekends, and holidays are recognized and programmed differently, workers who come in early or stay late may be uncomfortable. Likewise, zones that are vacant during a particular workday will be treated and being occupied, wasting energy. Special action must be taken by building management to accommodate special occupancy requests, such as working on weekends or unusual hours. To avoid this problem, set points are often left fully closed (occupied setting) around the clock, which is a substantial waste of energy.

SUMMARY

In the domain of Smart Buildings, the ability to predict future occupant needs, and intelligently address those needs preemptively, is a very powerful capability. For example, being able to predict accurately when a building or a section of a building will be occupied and preemptively adjust lighting and HVAC (Heating, Ventilation & Air Conditioning) optimizes occupant comfort. Conversely, being able to predict accurately when buildings and sections of buildings will be unoccupied and setting lighting and HVAC for maximum energy savings during those periods minimizes energy consumption. A particular automated facilities management system also changes settings in anticipation of changes in occupancy. For example, coasting is done well in advance of the time that the space will be unoccupied. Doing all provides better comfort and energy savings.

An automated facilities management system in accordance with particular embodiments of the invention has the ability to predict occupant behavior by identifying recurring patterns in the way that people use buildings and comparing them with environmental characteristics. This technology is not limited to human behavior patterns, but extends to any mechanical systems or data points that tend to vary in recurring patterns.

A particular embodiment of the invention includes a method for predicting future behavior. That method includes:
collecting historical data related to a behavior;
processing the historical data into intervals related to the behavior;
processing the intervals of historical data into a plurality of patterns;
comparing current data related to the behavior with the patterns to determine a best fit pattern that is most similar to the current data; and
applying the data in the best fit pattern to predict future data related to the behavior.

In more particular embodiments, the behavior can be a group behavior. Also processing the intervals of historical data can include performing a cluster analysis to identify the patterns. Additionally, comparing the current data can include performing a cluster analysis to identify the best fit pattern from the plurality of patterns. That cluster analysis can weigh recent current data more than distant current data.

The intervals can be divided into an equal number of slices. Specifically, the slices can be consecutive time slices.

Furthermore, the method can include making adjustments in anticipation of the predicted data. In addition, the method can solicit feedback and make adjustments in response to the feedback.

Another embodiment of the invention can include a system for automatically managing a facility. The system can include:
a plurality of sensor devices providing sensed data;
a plurality of control devices for actuating facility devices;
a data store having a plurality of patterns related to the sensor devices;
a processor coupled to the data store, the sensor devices, and the control devices, the processor being responsive to the sensed data over time from the sensor devices to:
store the sensed data over time in the data store;
calculate the best match pattern from sensed data over time and the plurality of patterns;
predict future sensed data from the best match pattern; and
signal a control device based on the predicted future sensed data.

Another particular embodiment of the invention can include an automated computing system, including a database system and a rule.

The database system can store data in an organized structure and trigger an event upon modifications to the stored data. The database system can include an ACID-compliant relational database storing the data in tables with data columns.

The rule can be responsive to the triggered event to process an action based on the stored data. The rule can include a rule definition identifying the data that triggers the rule. More particularly, the rule definition can include a list of data that triggers the rule. The rule can also include an assigned priority.

As for the action, the action can succeed or fail and a failed action can be retained and can be restartable.

Another particular embodiment of the invention can include a more particular automated computing system, including a relational database system and a plurality of rules.

The relational database system can store data in an organized structure of tables having columns of data. The relational database system can also trigger an event upon modifications to the stored data. In particular, the relational database can be ACID compliant.

Each rule can include a list of table and column pairs in the relational database that trigger the rule and an action process responsive to a event to the data stored in a table and column from the list, where the action can process a subset of the stored data. The rule can further include an assigned priority.

In particular, the subset of stored data can include data not in the table and column pairs. Also a plurality of instances of a same rule can execute in parallel. Furthermore, instances of the same rule can be triggered by different table and column pairs. The triggering and execution of the rules can be multi-threaded and/or asynchronous.

Furthermore, the action can succeed or fail and a failed action can be retained and can be restartable. More particularly, triggered rules can be stored as entries in an execution queue. The rules entered in the execution queue can be modified. Those modified rules can also be consolidated.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 18 is an exemplary user interface for feedback devices.

DETAILED DESCRIPTION

An automated facilities management system in accordance with particular embodiments of the invention is useful in residential and commercial buildings. In particular, the system can tailor a building's energy usage to known or derived occupancy patterns and the building's energy parameters. By doing so, energy can be more efficiently used when needed and conserved when not needed.

Figure 1:
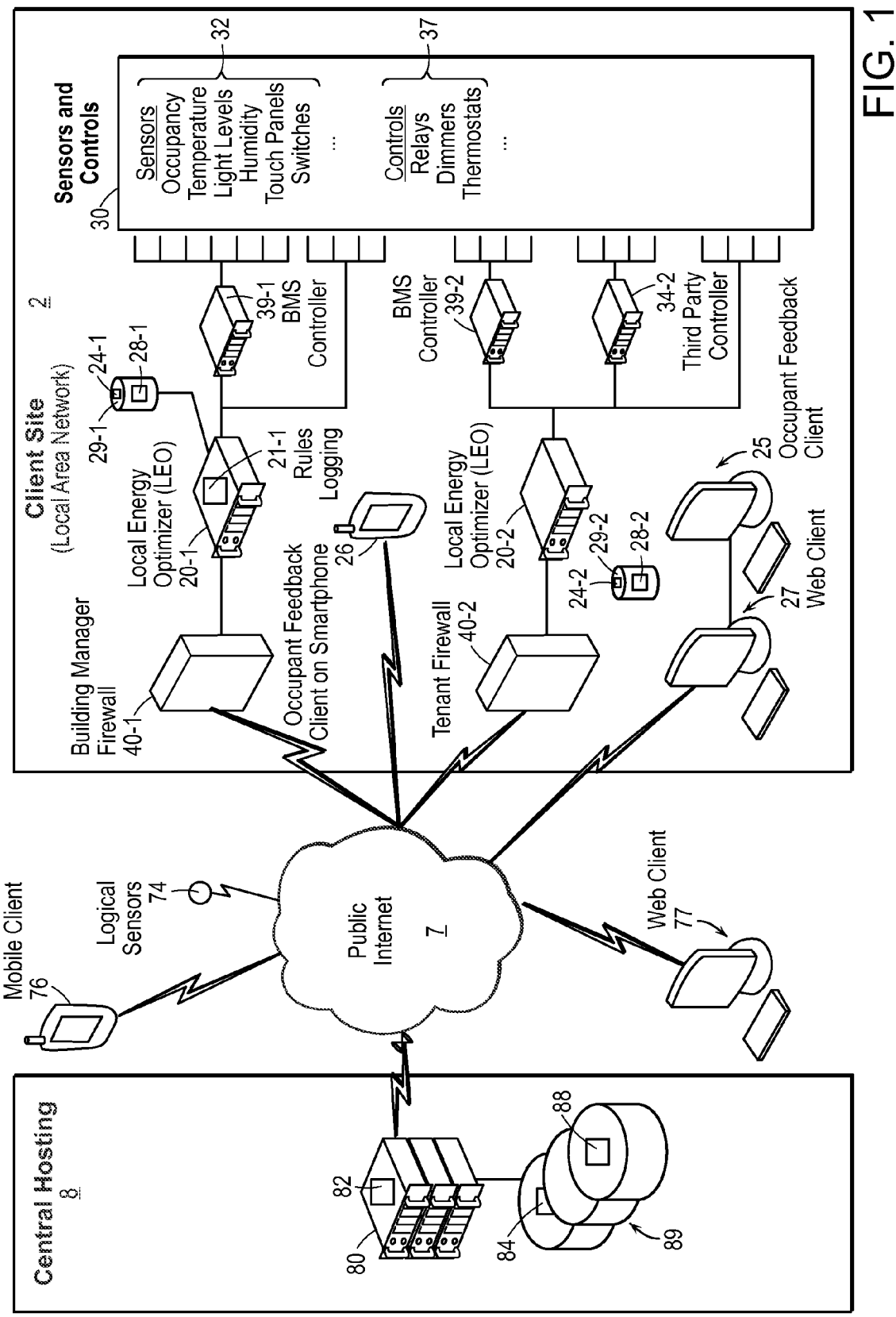
FIG. 1 is a schematic block diagram of a particular automated facilities management system.

FIG. 1 is a schematic block diagram of a particular automated facilities management system. The system includes a client-side infrastructure 2 on a Local Area Network (LAN) and a remote central hosting infrastructure 8. The client-side infrastructure 2 communicates with the central hosting infrastructure 8 via a Wide Area Network (WAN) 7, such as the public Internet.

The client-side infrastructure includes one or more Local Energy Optimizers (LEO) 20-1, 20-2. Each LEO 20-1, 20-2 is responsible for executing a local energy conservation plan. A particular building may require multiple LEOs, depending on various factors including network infrastructure. Indeed, each business operating within a building can have one or more dedicated LEOs. The LEOs function autonomously, but each will generally be embodied in a commercially-available desktop or laptop computer having limited processing power and memory.

Each LEO 20-1, 20-2 is in communication with a plurality of facility devices 30 located throughout a monitored space. The facility devices 30 include sensors 32 and controls (i.e. actuators) 37.

While the sensors 32 can directly communicate with the LEOs 20-1, 20-2, certain sensors 32 communicate via a separate sensor controller 34-2, such as a third-party Crestron controller. Example sensors include, but are not limited to:

occupancy sensors to detect the presence of a person, such as Infrared motion sensors, Bluetooth, RFID, or other wireless RF emitters, oxygen sensors, and manually activated switches (light switches, computer keyboards, touch panels etc.);

temperature sensors to detect the temperature at the sensor;

gas detectors, such as carbon monoxide detectors;

humidity sensors; and light sensors to detect the light level at the sensor.

Similarly, the LEOs 20-1, 20-2 forward commands to a plurality of controls 37 to adjust the energy usage of the space. Examples of such controls include, but are not limited to:
relays;
thermostats; and
light dimmers.

While the LEOs 20-1, 20-2 can directly communicate with the controls 37, such as in a residential environment, a particular embodiment of the invention exploits third-party Building Management System (BMS) controllers 39-1, 39-2 to operate facility controls 37. Such BMS controllers 39-1, 39-2, available from various sources, are typically installed in commercial buildings to control and monitor the building's mechanical and electrical equipment such as HVAC, lighting, power systems, fire systems, and security systems.

In particular, commercial BMS controllers 39-1, 39-2 are programmed to operate a network of control actuators 37 to obtain a desired result (e.g. temperature change). In other words, the building's BMS controllers 39-1, 39-2 already know what systems need to be adjusted and how each component in the system (dampers, mixing valves, etc.) needs to be actuated to accomplish a result without compromising other parts of the system. What the BMS controllers lack is an understanding of when to make macro adjustments such as zone temperature changes, instead relying on human policy or configuration input. By integrating with the BMS, the LEOs automate the "when" part of the equation by predicting future needs. The actual protocols used to communicate with the BMS are product specific.

More particularly, when to apply changes to HVAC settings in anticipation of a predicted change in occupancy is determined by establishing the heating and cooling characteristics of the HVAC zone through regression analysis of the rate of change in temperature as a function of HVAC heating or cooling demand, interior temperature, exterior temperature, and solar heating through windows. The coefficients derived from this analysis establish the characteristic of the zone. By applying these coefficients to actual conditions, the time to heat or cool the space to the desired temperature can be determined. Once this time has been established, it can be applied to the predicted occupancy and an optimal time to either actively heat or cool the space, or turn off active heating and cooling and let the temperature settle, can be determined. By continually performing this analysis, changes in coefficients will be indicators of changes in HVAC system performance or in building shell performance.

Data from the sensors 32 is stored in a local data store 29-1, 29-2 as relational database tables 28-1, 28-2. Each LEO 20-1, 20-2 includes a respective rules engine 22-1, 22-2 for processing the stored sensor data and signaling the controls 37 and BMS controllers 39-1, 39-2, if necessary. Each rules engine 22-1, 22-2 employs a respective rules database 24-1, 24-2 to manage data and processing. In a particular embodiment, the rules engines 22-1, 22-2 are implemented as Windows Services under a Microsoft Windows operating system.

Also in communication with the WAN 7 and accessible by the LEOs 20-1, 20-2 are logical sensors 74, which provide external data to the LEOs 20-1, 20-2. Examples of logical sensors 74 include weather forecasts, such as provided by Google, Inc., climate models, electricity rates, time signals from time services, and other data feeds.

The LEOs 20-1, 20-2 communicate through the WAN 7 with a central server 82 on the central hosting infrastructure 8. It should be understood that the database for an LEO can include data from sensors 32 that signal another LEO, by receiving the sensor data over the LAN or via the central server 82. Specifically, the LEO will periodically send data to the central server 80 for storage or transfer to another LEO. The LEO can also send a request for data to the central server 80, where it will either reply with data or timeout. Because the LEOs 20-1, 20-2 will typically communicate through a firewall 40-1, 40-2, the communication is initiated by the LEOs 20-1, 20-2 through an open firewall port (such as a HyperText Transport Protocol (HTTP) request through port 80).

The central server 80 is responsible for storing long-term data and operating on the data, particularly pattern detection and analysis. The central server 80 communicates with a data warehouse 89 storing a relational database 88. Human interaction with the system is through a computer interface, such as a web client 27 (PC), 77 (smartphone), a mobile client 76 or feedback devices 25 (smartphone), 26 (PC). Note that human interaction can also be initiated on the central hosting infrastructure 8, depending on how implemented.

By disposing the central server 80 on the WAN 7, the data warehouse 89 can be used to store historical data and patterns from numerous client sources. That micro data can then be exploited to derive macro data for use by energy utilities and energy brokers. To that end, a particular embodiment of the invention deploys the central hosting infrastructure 8 on a commercial cloud computing system. Of course, the central server 80 and data warehouse 89 can be disposed on the client LAN for clients, such as government entities, that desire or require secure control over its data and patterns.

The central data warehouse 89 stores historical data for each LEO 20-1, 20-2 and each LEO 20-1, 20-2 locally stores current data at least until transferred to the central server 80, such as once per day (e.g. overnight transfer). Once the central data warehouse 89 stores a sufficient amount of historical data, the historical data is processed by a server rules engine 82 on the central server 80 to detect patterns in the data. The rules engine 82 employs a server rules database 84 to manage data and processing. Again, in a particular embodiment, the rule engine 82 is implemented as Windows Services under a Microsoft Windows operating system.

One important measure of patterns is the occupancy rate of an office or home as viewed over a period of time, such as daily. For example, instead of a building usage following a simple, weekday or weekend pattern there can be several usage patterns for both a weekday and a weekend. Knowing those patterns allows significant energy conservation by anticipating demand. In a particular embodiment, pattern detection and recognition processing is performed at a convenient periodic time, such as on a weekly basis.

Once patterns are recognized, those patterns are useful for predicting future behavior, such as occupancy. Specifically, as long as occupancy can be correlated with a known pattern, it can be assumed that the pattern will continue at least for the near term. For that use, the various detected patterns are transferred to the LEO databases 28-1, 28-2 for real-time matching.

Figure 2:
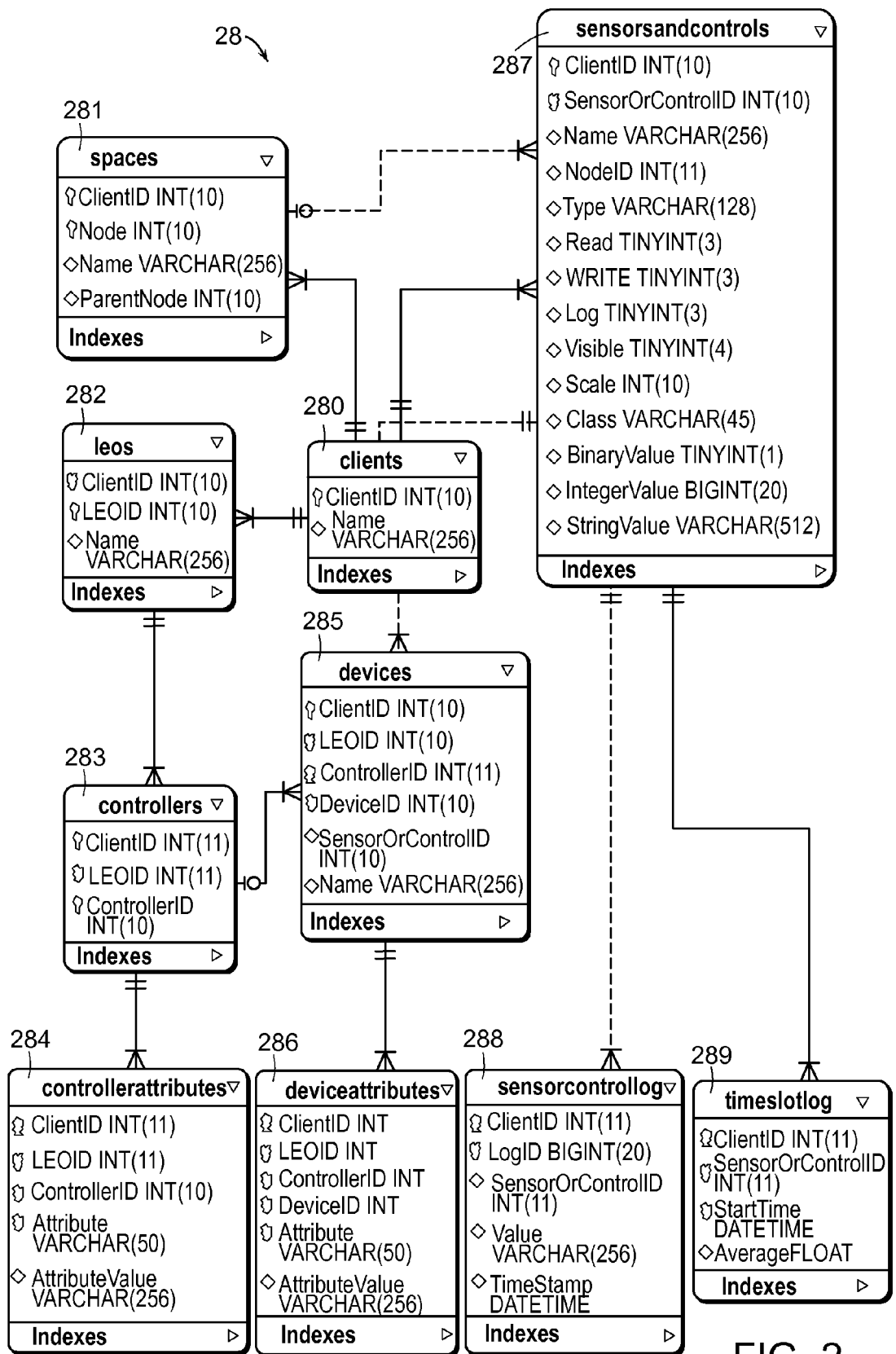
FIG. 2 is a schema diagram for a simplified LEO database of FIG. 1.

FIG. 2 is a schema diagram for a simplified LEO database of FIG. 1. The LEO database 28 is shown as a group of related data tables. The tables include a clients table 280, a spaces table 281, a leos table 282, a controllers table 283, a controllerattributes table 284, a devices table 285, a deviceattributes table 286, a sensorsandcontrols table 287, a sensororcontrollog table 288, and a timeslotlog table 289. It should be understood that the illustrated database is not a complete database, but instead is meant to highlight some core aspects of the data.

The clients table 280 defines the installations of the management system included in the database. The table columns include:
ClientID: Unique identifier for the installation
Name: A descriptive name for the installation The spaces table 281 includes hierarchical definitions of the spaces (locations, buildings, floors, zones, rooms) of all installations. The table columns include"

ClientID: The installation that this space is within
NodeID: A unique identifier for this space within the installation
Name: A descriptive name for this space The leos table 282 includes entries for all LEOs within all installations. The table columns include:

ClientID: The installation that this LEO is installed at
LEOID: A unique identifier for this LEO within the installation
Name: A descriptive name for this LEO The controllers table 283 includes entries for all interfaces to controllers, sensors or controls across all installations. The table columns include:

ClientID: The installation that the interface is installed at
LEOID: The LEO that communicates with the interface
ControllerID: A unique ID for this interface on this LEO A controller represents an interface to a third-party controller or a network interface and protocol to a bank of directly controlled sensors and controls. The controllerattributes table 284 controls meta data describing the controller. Controllers are associated with LEOs. These are physical associations.

The controllerattributes table 284 thus includes entries that define the attributes for each controller, such as the type of interface (BMS, Bluetooth, ZigBee), the address of the interface, and any other interface-specific meta data. The table columns include:

ClientID: The installation that the interface is installed at
LEOID: The LEO that communicates with the interface
ControllerID: A unique ID for this interface on this LEO
Attribute: A controller-unique name for the attribute
Value: The value of the attribute The devices table 285 includes an entry for each device (sensor or control). The table columns include:

ClientID: The installation that the device is installed at
LEOID: The LEO that communicates with the interface
ControllerID: The controller that this device is interfaced through
DeviceID: A controller-unique ID for this device
SensorOrControlID: If not null, the sensor or control that should receive send data to or from this device
Name: A descriptive name for this device Notice that sensors and controllers are directly tied to spaces. These connections may be physical or logical. The connection between sensors and controls to LEOs is through devices and controllers.

The deviceattributes table 286 includes entries that define attributes for each device, such as the network address. The table columns include:

ClientID: The installation that the device is installed at
LEOID: The LEO that communicates with the interface
ControllerID: The controller that this device is interfaced through
DeviceID: The ID for this device
Attribute: A device-unique name for the attribute
Value: The value of the attribute The sensorsandcontrols table 287 includes entries for all sensor values, control settings and intermediate values used by rules. The table columns include:

ClientID: The installation that this value is used by
SensorOrControlID: A client-unique ID for the value
Name: A descriptive name for this value
NodeID: If not null, the ID of the space (zone, room, . . . ) that the sensor or control is associated with
Type: "Binary", "Range", "String", or "Timer". The type of value.
Read: If 1, indicates that the value is read from a sensor
Write: If 1, indicates that changes in the value need to be written to a control
Log: If 1, indicates that any changes in the value must be transmitted to the central server
Visible: If 1, indicates that the value should be visible through the reporting interfaces
Scale: Constant used for normalization
Class: The class of value, like temperature, motion, light, . . . .
BinaryValue: Contains the value if Type="Binary" and the alarm status is Type="Timer"
RangeValue: Contains the value if Type="Range" and the countdown timer if Type="Timer"
StringValue: Contains the value if Type="String"

Figure 3:
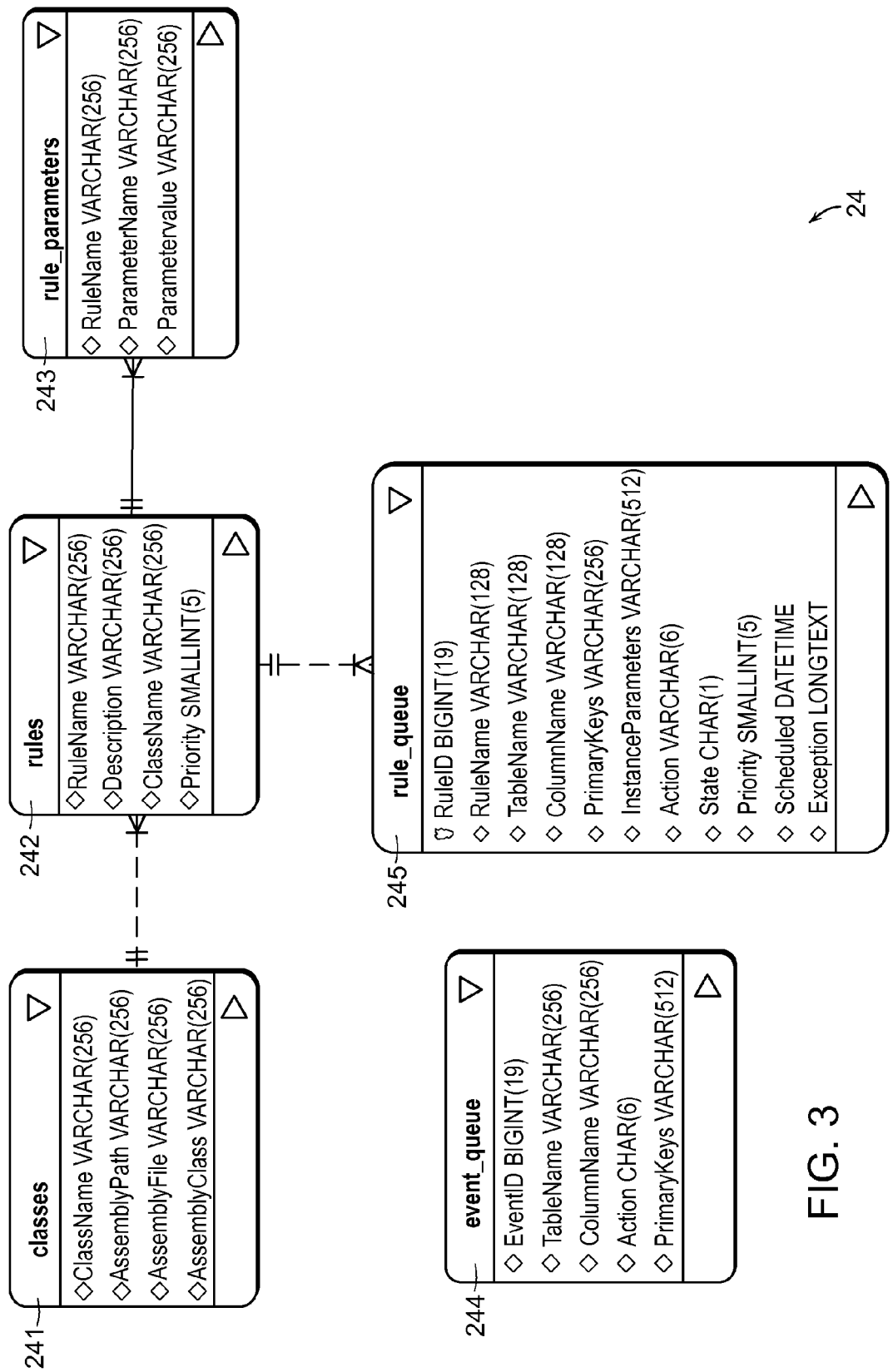
FIG. 3 is a database schema diagram for a rules database used by the rules engines of FIG. 1.

The sensororcontrollog table 288 includes the new value and time of transitions for sensors and controls. The table columns include:

ClientID: The installation that the sensor or control is installed at
LogID: Unique identifier for this entry in the table
SensorOrControlID: The ID of the sensor or control
Value: A string representing the new value of the sensor or control
TimeStamp: The date and time of the transition The timeslotlog table 289 includes average values for a sensor or control across a time slot. The table columns include:

ClientID: The installation that the sensor or control is installed at
SensorOrControlID: The ID of the sensor or control
StartTime: The date and time of the start of the time slot
Average: The average value of the sensor or control during the time interval FIG. 3 is a database schema diagram for a rules database used by the rules engines of FIG. 1. The rules database 24 is shown as a group of related data tables. The tables include a classes table 241, a rules table 242, a rule_parameters table 243, an event_queue table 244, and a rule_queue table 245. Here again, it should be understood that the illustrated database is not a complete database, but instead is meant to highlight some core aspects of the data.

The classes table 241 defines the base classes for rules and includes columns with meta data for loading the code implementing the classes. The table columns include:

ClassName: Unique name for the class
AssemblyPath: Contains the storage path to the folder containing the assembly containing the class assembly file.
AssemblyFile: Contains the file name of the assembly class file.
AssemblyClass: The name that the class is registered as in the assembly class file The rules table 242 defines all rules. It includes an entry for all rules being used by the application running on the rules engine. The table columns include:

RuleName: Unique name for the rule.
Description: A short description of the rule.
ClassName: The name of the class from which the rule is derived.
Priority: The priority that the rule will run at (1 and up). Smaller values are higher priorities.

The rule_parameters table 243 is used when deriving multiple rules from a single class. It may, for example, define the table(s) and column(s) that the rule will be triggered by and perform actions on. The table columns include:

RuleName: Name of the rule the parameter customizes.
ParameterName: Rule-unique name of the parameter.
ParameterValue: Value of the parameter.

The event_queue table 244 includes a FIFO (First In, First Out) queue of events. The table columns include:

EventID: Unique ID for the event
TableName: Name of the table that triggered the event
ColumnName: Name of the column that triggered the event
Action: "Insert", "Update" or "Delete". Contains the verb of the SQL statement that triggered the event.
PrimaryKeys: Encoded string containing the values of the primary key fields of the row that triggered the event The rule_queue table 245 includes an entry for each rule that is queued for execution, running, or has failed. The table columns include:

RuleID: A unique ID for the rule instance (multiple instances of the same rule, triggered by different events, may exist in the queue)
RuleName: The name of the rule
TableName: The name of the table that triggered the rule
ColumnName: Name of the column that triggered the rule
PrimaryKeys: Encoded string containing the values of the primary key fields of the row that triggered the rule
InstanceParameters: String that further defines the data the rule should act on. May be set when a rule is scheduled by another rule or by external code
Action: "Insert", "Update" or "Delete". Contains the verb of the SQL statement that triggered the rule
State: "N" (waiting to run), "W" (running), "R" (running to be rescheduled after completion), or "F" (failed)
Priority: Priority of the rule
Scheduled: The date and time the rule was scheduled or rescheduled
Exception: Information about the nature of the failure when State="F"

With the basic structure of the system and its databases, the detailed processing will now be described.

Figure 4:
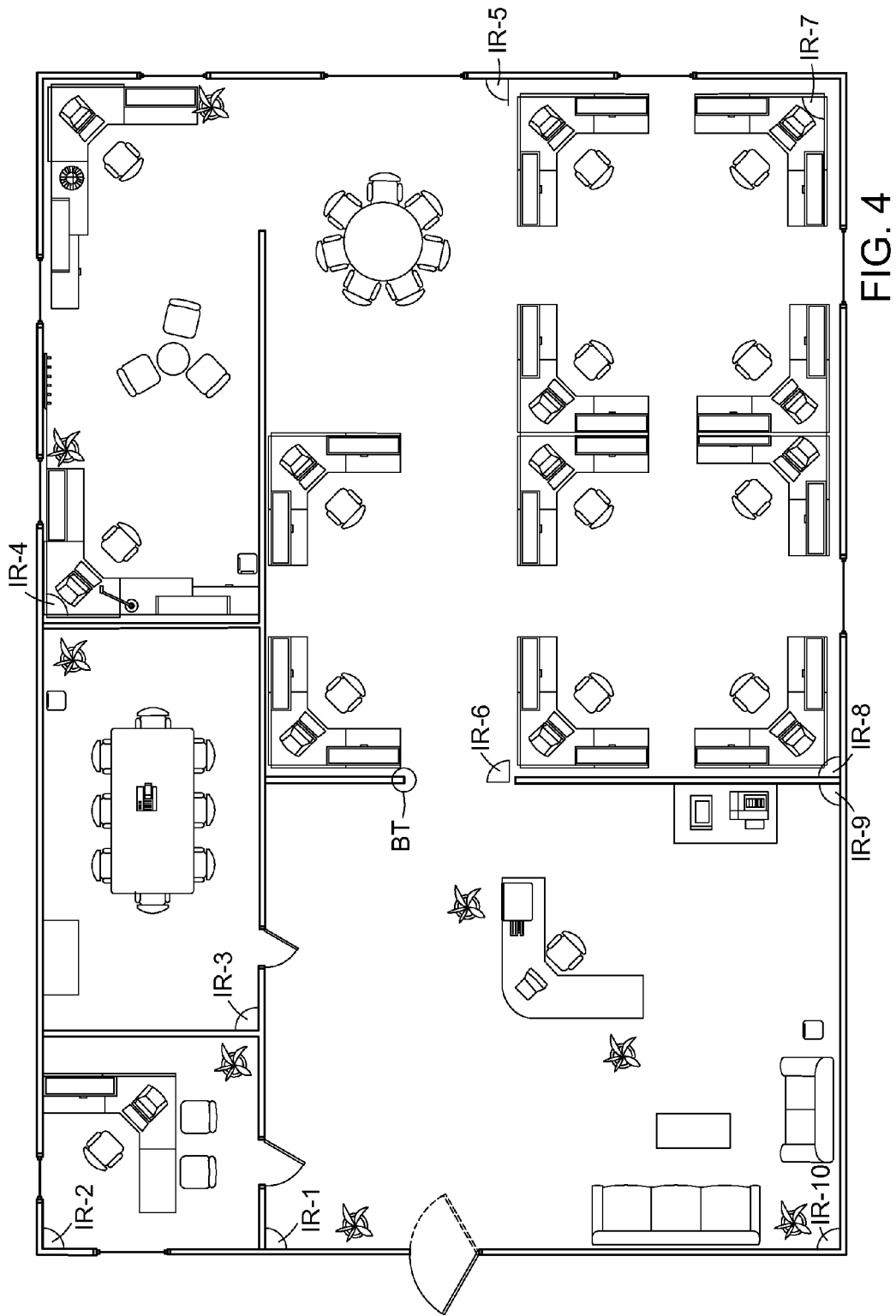
FIG. 4 is a pictorial diagram of an exemplary office having a simplified array of sensors.

FIG. 4 is a pictorial diagram of an exemplary office having a simplified array of sensors. The office includes a number of office spaces, cubicle spaces, and meeting spaces. As shown, infrared motion sensors IR-1 . . . IR-10 are dispersed throughout the office. In addition, a Bluetooth receiver BT is centrally located and paired with employee Bluetooth devices (mobile phones, etc.). It should be understood that many more sensors can be deployed and interfaced with an LEO to detect and measure occupancy.

The communication between the IR sensors and the LEO (not shown) is determined by the sensor manufacturer. Some manufacturer will signal whenever a change is detected, and some will periodically signal. For this example, it is assumed that the IR sensors signal changes. Also, the Bluetooth emitters are periodically polled on a rolling basis, generally cycling every few seconds depending on the number of emitters and system load.

In the early morning, the office would typically be unoccupied so all the sensors are inactive. From the database, we can determine when employees left the office by looking at data stored for their respective Bluetooth (cell phone) emitters.

As the workday begins, Bluetooth emitters from cell phones and signals from the IR detectors will begin to be reported as active. Throughout the day motion continues to be detected throughout the office. Some people may come and go, and others will move around to continually populate the database.

As the workday comes to an end, people will begin leaving the office so sensor activity will decrease. Some people may stay later than others but typically, everyone will leave for the night. Sporadic activity may be detected from cleaning crews, security patrols, and employees returning to the office to work or to retrieve forgotten items. People fitting those demographics usually do not require a change in the environmental settings.

As can be appreciated, occupancy and usage patterns of a space can be tracked and plotted. To that end, the data changes are logged for forwarding to the central server 80. The central server 80 analyzes the historical data. In particular, the central server 80 performs statistical analysis to recognize patterns in the data, such as occupancy patterns. Further analysis can provide more individualized information, such as individual space usage patterns.

Figure 5:
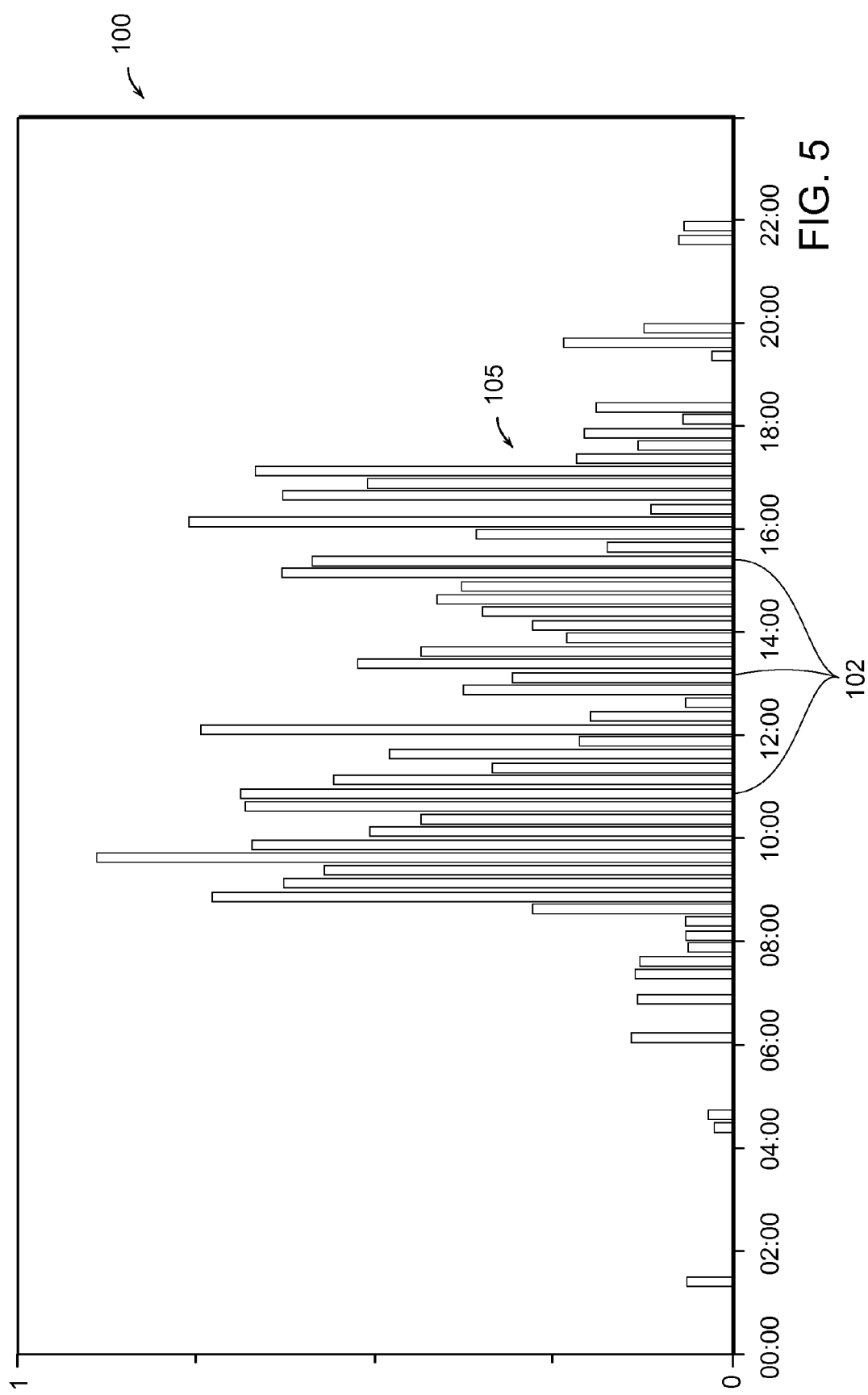
FIG. 5 is an exemplary normalized graph of all occupancy sensor readings for the office of FIG. 4 over a one-day time interval.

FIG. 5 is an exemplary normalized graph of all occupancy sensor readings for the office of FIG. 4 over a one-day time interval. To create the graph 100, all occupancy-related sensor readings are transformed into averaged readings over fixed time slices 102 along the horizontal axis. The data is then normalized between values of 0-1, as shown by the vertical axis. The resulting pattern 105 represents the occupancy levels of the space throughout the day.

The length of the time slices is chosen to match the application of the pattern, which in an HVAC application is a function of balancing data operations performance against providing balanced energy efficiency. For example, when controlling heating and cooling, a 15-minute time slice is a typical choice that strikes a balance between the amounts of data generated and the granularity required for optimum comfort. The time slice can be variable over time, based on circumstances. So if data quantities were moderate, and comfort could be enhanced by shorter time slices, the time slices for a space could be shortened.

By averaging sensor values, the system determines the probability of certain behaviors for various time intervals with similar characteristics (such as day of week). The patterns act as a predictor of sensor values for a given time slices in the future, especially the next time slice. To that end, the system gathers sensor data over time, groups the data by time intervals with similar characteristics, then compares new time intervals with similar characteristics to find matches. If a match is found, the system predicts sensor values in the new time interval by recalling the values found in the past time intervals with similar characteristics. Because sensor values are indicative of specific human behaviors, such as occupancy, the system becomes reliable in the prediction of such human behavior.

Once the human behavior is patterned, the results can be used in facilities management. Specifically, predictions based on the patterns are used to tailor temperature and lighting levels to the environment. The patterns can also be used to examine other facility metrics, such as space usage and planning. For example, individual schedules can be monitored to see if people really use scheduled rooms. Rooms can also be consolidated into common zones. Another example application of scheduling involves factory scheduling and school schedule.

In addition to human behavior, the system is sensitive to changes in the electrical and mechanical performance of the building. If the facilities equipment and physical building do not behave or respond as expected, those deviations can be logged. As such, the facilities management system can perform monitoring-based commissioning of the facility.

Figure 6:
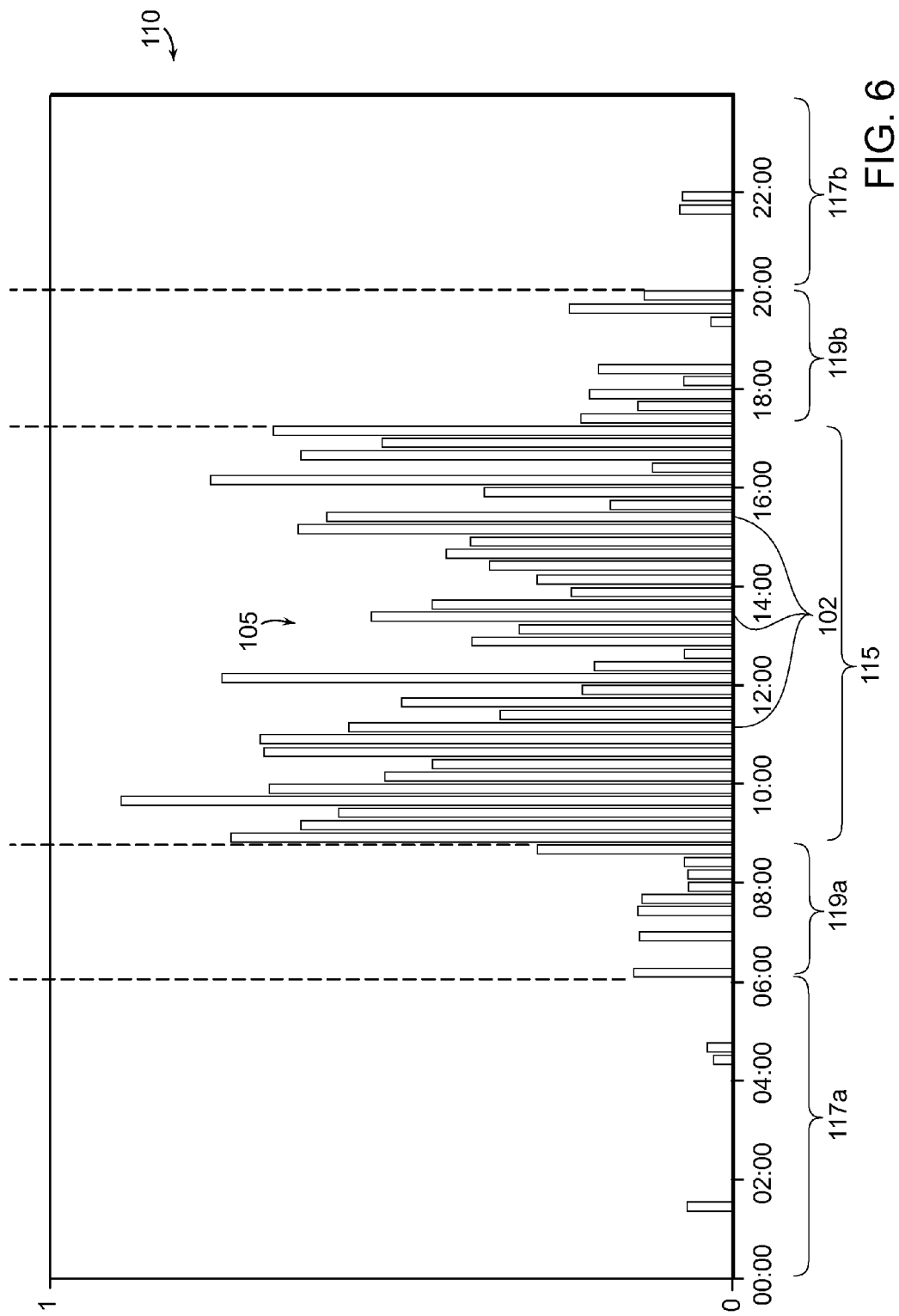
FIG. 6 is a graph showing the application of an exemplary occupancy pattern of FIG. 5 to thermostat settings.

FIG. 6 is a graph showing the application of an exemplary occupancy pattern of FIG. 5 to thermostat settings. The graph 110 shows the exemplary occupancy pattern 105 for the office environment. As shown, the pattern 105 is a series of averaged sensor readings over a plurality of consecutive time slices 102.

Viewing the data, the pattern 105 can be divided into multiple operational segments. The office is occupied from the morning until the evening, with some people coming in earlier than others and some people leaving later than others. There is no overnight occupancy. During the occupied working hours segment 115, the HVAC plan can focus on optimizing employee comfort. During the overnight segments 117a, 117b, the office is generally unoccupied and the HVAC system can focus on maximizing savings. During morning and evening standby segments 119a, 119b, people are entering or leaving for the day and the HVAC plan can maintain an intermediate setting by either ramping up the HVAC system during the morning segment 119a, or allowing the HVAC system to coast to the overnight setting during the evening segment 119b.

When exactly the HVAC system is initially ramped up or begins coasting will depend on the thermal characteristic of the building. It is understood that the thermal characteristics of the building are not static or predefined. Instead, the system determines the rate at which space gains or dissipates heat as part of its normal operation, thereby self-learning the thermal characteristics that contribute to the "when" the ramping up or coasting begins.

Figure 7:
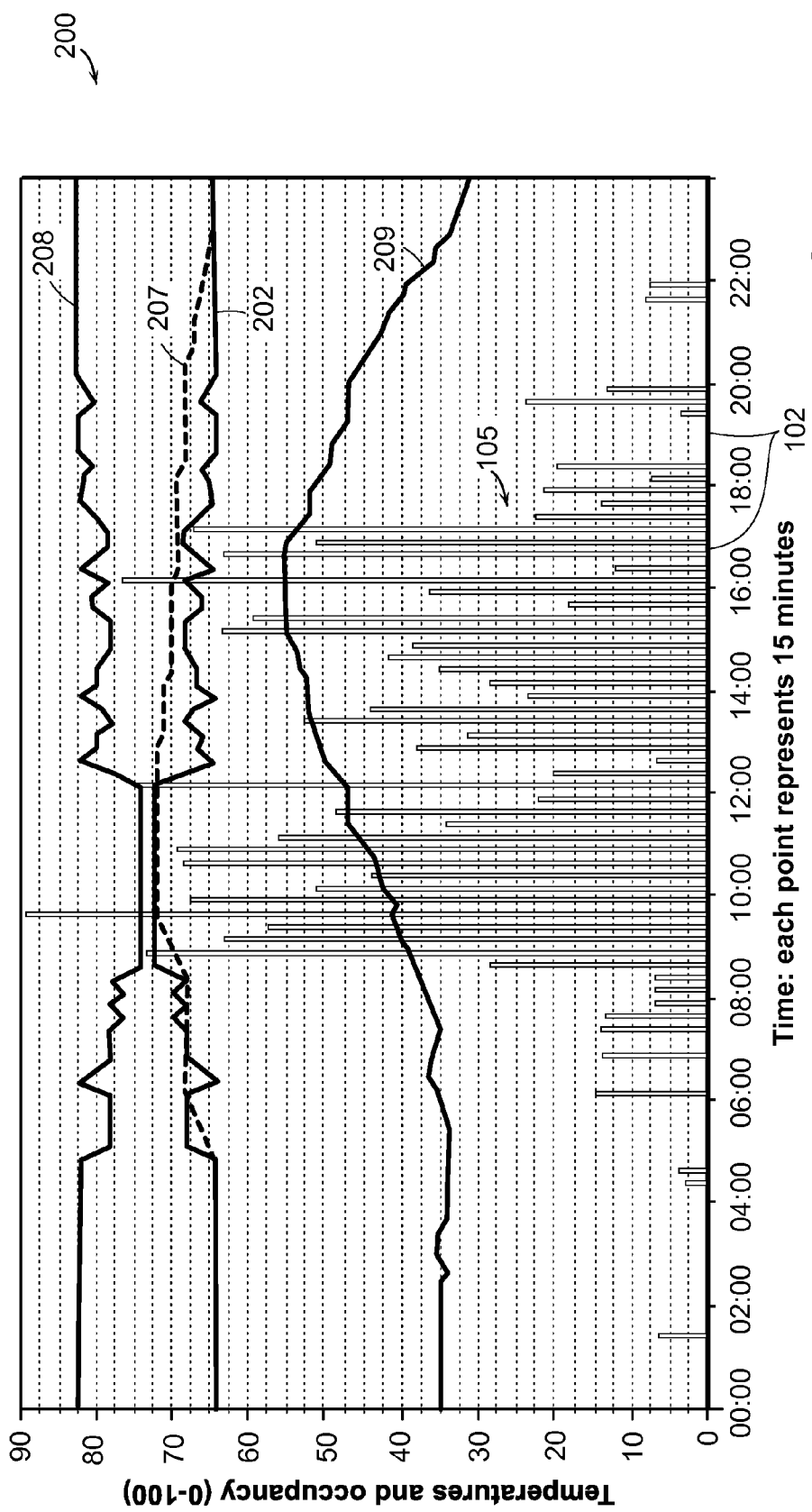
FIG. 7 is a graph showing a more detailed application of the exemplary pattern of FIG. 5 to thermostat settings.

FIG. 7 is a graph showing a more detailed application of the exemplary pattern of FIG. 5 to thermostat settings. Again, the graph 120 shows the exemplary occupancy pattern 105 at 15-minute time slices 102. Also shown, the pattern 105 is used to determine a target indoor temperature 127. Also shown are plots of the outside air temperature 129, the heating thermostat set point 122, and the cooling thermostat set point 128. In a commercial embodiment utilizing a BMS, the set points are computed by the BMS controller 39-1, 39-2 (FIG. 1). The temperature and occupancy values are also normalized to a 0-100 range based on the range of sensor values in the raw historical data.

It should be understood that the predicted pattern depends on the time interval characteristics. Characteristics are data that describe objects and time interval characteristics are data that describe time intervals. For example, in an office environment, occupancy is typically different on weekdays as opposed to weekends. Thus, the day of the week (e.g., Wednesday) is a characteristic of a "24-hour period starting and ending at midnight", and one that has an obvious relevance to the occupants of a space. Depending on the situation, a large number of other characteristics can be relevant. Examples include, but are not limited to:

Season
Current weather
   Temperature
   Amount of sunlight
   Wind
Weather forecast
Holidays
   The particular holiday itself
   The nature or category of holiday
   The week containing the holiday
Fiscal year status
Major projects
Epidemics
Academic calendar The system initially performs general pattern detection across all time intervals, disregarding characteristics such as the day of the week. The result is a number of patterns, each of which is characterized by average sensor values for each time slice, the number of time intervals that were used in generating the pattern, and the "density" of the pattern. Density is a measure of how similar the sensor data is across all the time intervals used to generate it. Patterns that are generated from many time intervals and are "dense" are strong indicators of recurring sensor data, and therefore strong predictors of future sensor values.

After the patterns have been ascertained, they are matched against time interval characteristics. For all time intervals that match a given characteristic, the system determines which pattern is the best fit. The result is a count for each pattern of the number of time intervals for which it was the best fit. The pattern that has the highest count of being the best fit is considered the best match for the selected characteristic. That best fit match is then used as a basis for predicting future behavior for facilities management.

Figure 8:
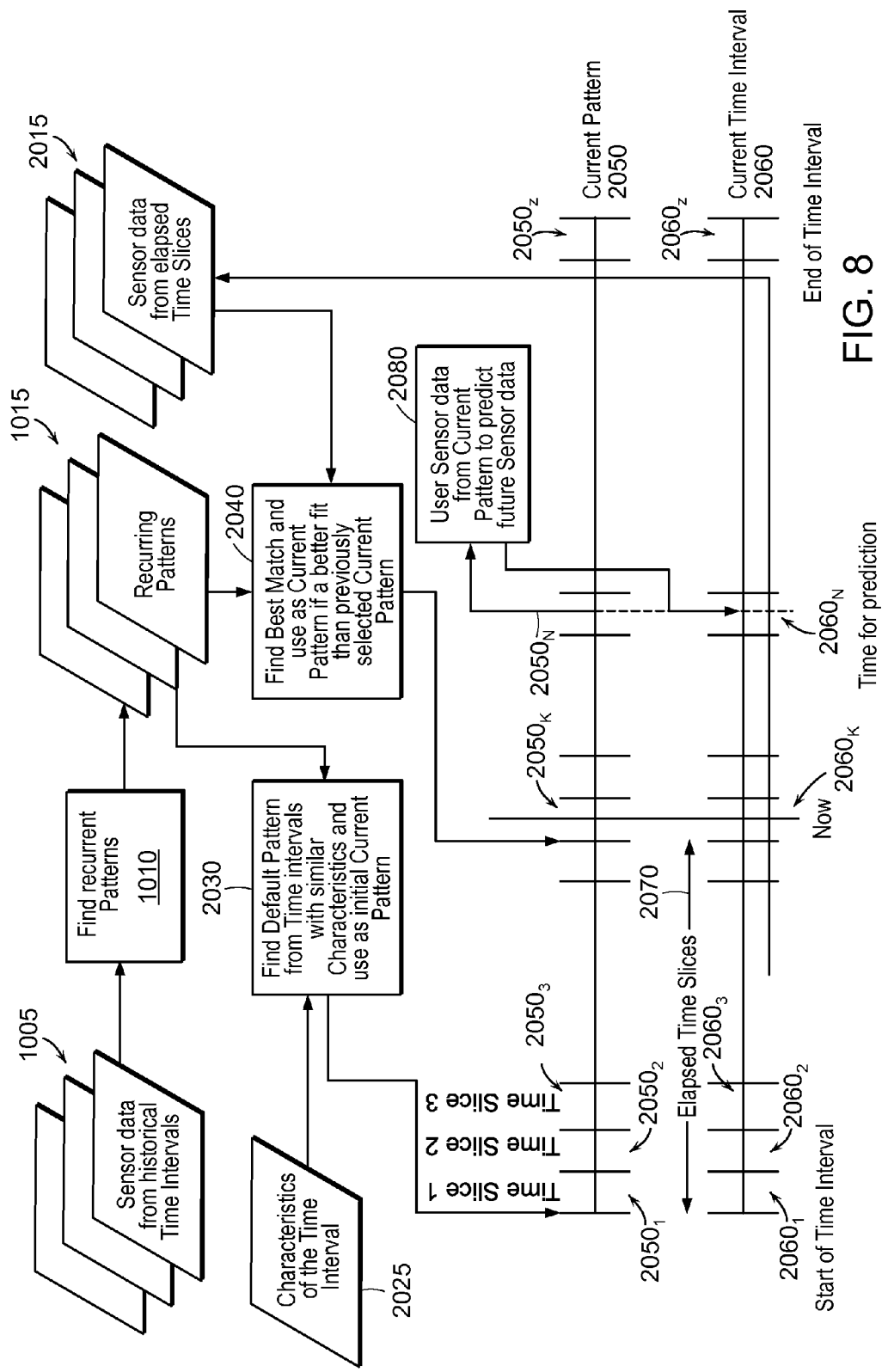
FIG. 8 is a flowchart of the overall process for pattern detection, matching, and prediction.

FIG. 8 is a flowchart of the overall process for pattern detection, matching, and prediction. The process begins at the server with retrieving sensor data from stored historical time intervals 1005, from which recurring patterns are detected at step 1010. The recurring patterns are then saved to storage 1015 for sharing with the client LEOs.

On the client-side, the stored recurring patterns 1015 are combined at step 2030 with the previously stored characteristics of the time interval 2025 to find a default pattern from time intervals with similar characteristics. That default pattern is then used as the initial current pattern 2050 at step 2030.

Pattern matching is now done against current time interval 2060, which has a starting time slice $2060_1$, a current time slice $2060_K$, and an ending time slice $2060_N$. For the elapsed time period 2070 from the starting time slice $2060_1$ to the last completed time slice $2060_{K-1}$, current data for each time slice $2060_1, \ldots, 2060_{K-1}$ is compared against data in a respective time slice $2050_1, \ldots, 2050_{K-1}$ in the current pattern 2050. The recurring patterns 1015 are also combined at step 2040 with sensor data from elapsed time slices 2015 to find the best match and use as the current pattern if a better fit is found than the previously selected current pattern.

Based on the sensor data in the current pattern, the process predicts future sensor data at step 2080. It should be understood that the prediction is most accurate for the current time slice and the next time slice in the future, while the prediction becomes less reliable as they more farther in the future. Once data collection for the current time slice completes, the matching algorithm at step 2040 and prediction algorithm at step 2080 are processed again, and iterative continues after each new time slice.

The algorithms used for pattern detection and matching are driven by a tradeoff between accuracy and performance. That compromise aims to achieve an optimum balance between accuracy, responsiveness, and computing resource consumption. The algorithms for measuring similarity of sensor readings between two time intervals and the heuristic algorithm for detecting recurring patterns in a large number of time intervals were developed with this balance in mind.

As an overview, every time a selected sensor value differs from the previous reading of the sensor, the date and time of the transition and the new sensor value is stored in a log file. At the end of each time slice, the average values for the selected sensors are calculated and stored with the date and time of the time slice in an averaged sensor value log file. The average values for all the selected sensors are normalized for equal weighting to ensure that all sensors have the same effect on the similarity calculations. A typical normalization formula adds a base value and multiplies the result with a factor to yield the same range of values for all the sensors. A typical normalization will map all sensor values into a numerical range from 1 to 100.

The general normalization equation is:

$$R_n = N_{min} + (R_a - R_{min}) * (N_{max} - N_{min}) / (R_{max} - R_{min})$$

where $R_n$ is the normalized value, $R_a$ is the average sensor value, $R_{min}$ is the smallest value the sensor can return, $R_{max}$ is the maximum value the sensor can return, $N_{mm}$ is the smallest possible normalized value, and $N_{max}$ is the largest possible normalized value. In some cases it may be desirable to select $R_{min}$ and $R_{max}$ as the smallest and largest typical sensor values as opposed to the smallest and largest possible sensor values.

The normalized average sensor value is stored in a log file with the time slice for which it was calculated.

Figure 9:
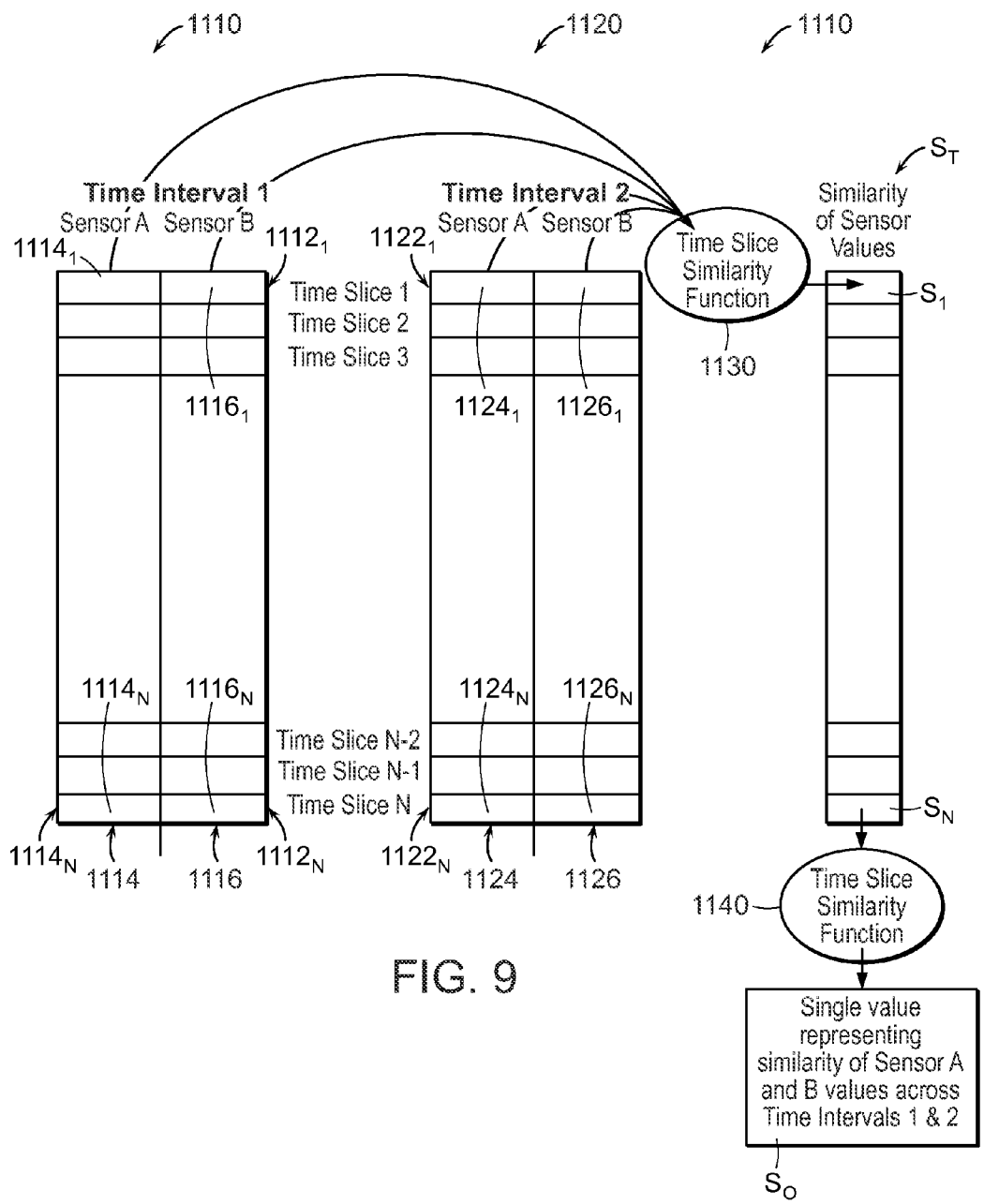
FIG. 9 is a block diagram illustrating the process of calculating the similarity of sensor readings for two time intervals.

FIG. 9 is a block diagram illustrating the process of calculating the similarity of sensor readings for two time intervals. As shown, the process 1110 divides time intervals into N equal-sized time slices $1112_1, \ldots, 1112_N$ and $1122_1, \ldots, 1122_N$. For each time slice, a data value $1114_1, \ldots, 1114_N$, $1116_1, \ldots, 1116_N$ and $1124_1, \ldots, 1124_N$, $1126_1, \ldots, 1126_N$ is stored for each sensor.

The first step 1130 is to calculate the similarity of sensor values for each corresponding time slice in the two time intervals. The time slice similarity function is:

$$S_T = \sqrt{\frac{\sum_{I=1}^{M}(R_{IT1} - R_{IT2})^2}{M}}$$

where $S_T$ is the calculated similarity for time slice T, $R_{IT1}$ is the normalized average sensor value for sensor I in time slice T for time interval 1, $R_{IT2}$ is the normalized average sensor value for sensor I in time slice T for time interval 2, and M is the number of sensors chosen for the calculation.

Once the similarity of individual time slices within a time interval are calculated, the overall similarity of the two time intervals is calculated at step 1140 as:

$$S_O = \sqrt{\frac{\sum_{T=1}^{N} S_T^2}{N}}$$

where $S_T$ is the similarity of sensor readings for time slice T, and N is the total number of time slices in a time interval.

The calculated value of similarity becomes zero when the sensor readings are identical across all time slices. Thus small values indicate a high degree of similarity and large values indicate significant differences in sensor readings. In accordance with a particular embodiment of the invention, the time slices are considered to be suitably similar if $S_o \leq 100$.

While a distance of 100 or less implies similarity in accordance with a particular embodiment. This value can be modified over time by determining what values deliver the best patterns. "Best" means delivering the largest number of patterns. High values deliver few, large patterns. Too small values will not deliver any patterns. It is anticipated that a few times a year, all historical data is analyzed to determine an optimal value. It should be appreciated that the optimal value is dependent on the characteristics of the space. For example, a residence will have a different optimal value than a commercial office space.

To detect recurring patterns of sensor readings, clusters of similar time intervals must be identified. Two approaches will now be described. The first approach is a precise approach that is guaranteed to identify all clusters, but scales poorly. The second approach is a heuristic approach that has been shown to find almost all possible clusters, but which does scale well.

The precise method was used during the development of the heuristic method to validate that they generated the same or very similar patterns. As increasing amounts of data is collected, or questions are raised about the accuracy of the heuristic algorithm, the precise algorithm can be used as a baseline for validation or improvements of the heuristic approach.

Figure 10:
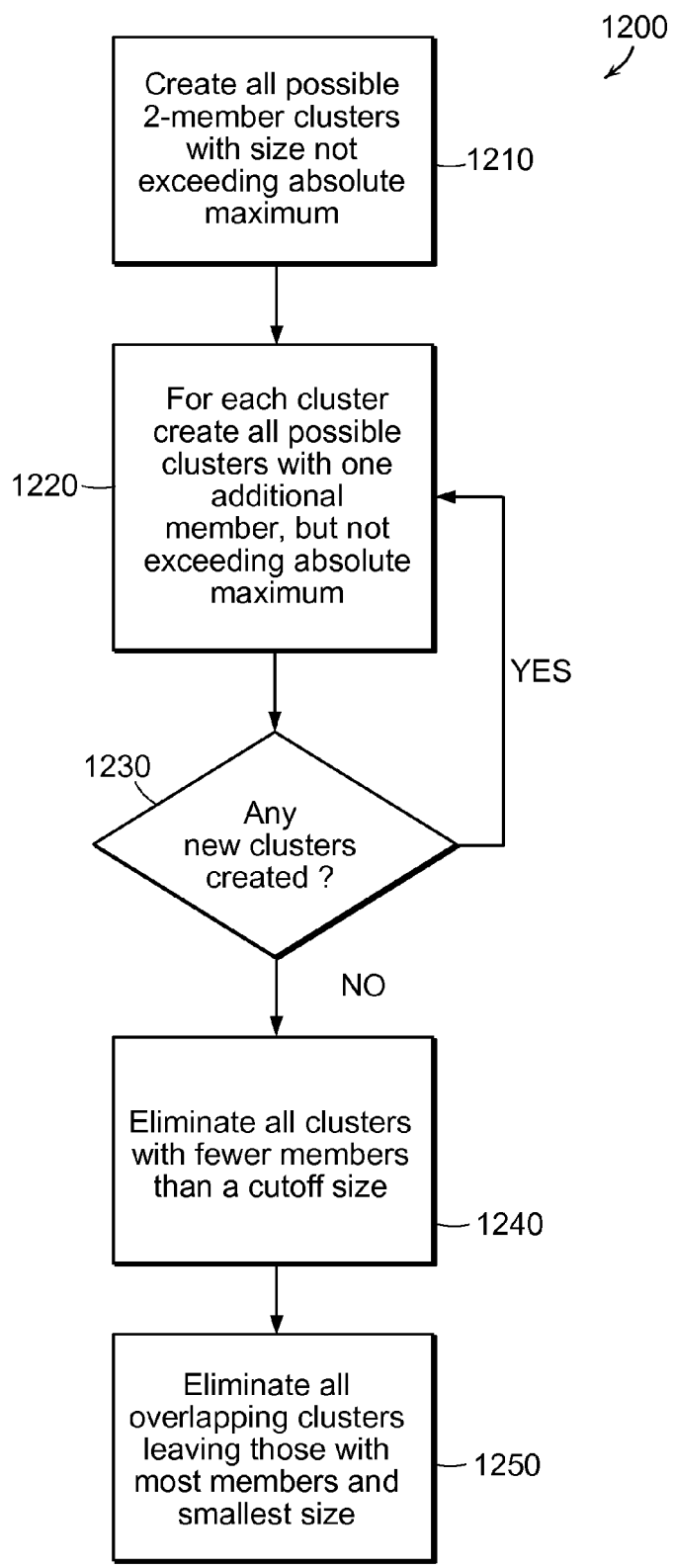
FIG. 10 is a flowchart for a particular precise method to identifying clusters.

FIG. 10 is a flowchart for a particular precise method to identifying clusters. The first step 1210 in the method 1200 is to create an initial set of two-member clusters that includes all possible pairs of time intervals with similarities no greater than an absolute maximum cluster size; a value chosen to ensure that clusters really represent similar patterns. The value is chosen by analyzing a representative data set with different settings. The setting that yields the best patterns/clusters becomes the chosen setting. "Best" will depend on the application. For this embodiment, "best" was defined as yielding the largest number of patterns.

Furthermore, a cluster also must have a minimum number of members. For this embodiment, three was chosen. The choice is application dependent and driven by whether there is a need or desire to yield patterns with small data sets, and the existence of a need for large numbers of patterns with large data sets.

The method then enters an iterative loop at step 1220 where all time intervals are tested against all clusters in which they are not already a member. At step 1220, for each cluster, all possible clusters are created with one additional member, but not exceeding the absolute maximum cluster size. If the addition of the time interval to the cluster does not cause the cluster to exceed the maximum cluster size, the time interval is added to the cluster. The iterative loop continues through step 1230 until a pass does not add any time intervals to any clusters. All possible clusters no larger than the absolute maximum cluster size are thus identified.

Two additional steps are performed. First, at step 1240, all clusters less than a certain size are eliminated. An optimal cutoff size depends on the data, but typically one to two orders of magnitude smaller than the total number of time intervals contributing to the process. Next, at step 1250, the process eliminates overlapping clusters, i.e. clusters that share members. The approach is to eliminate all but the cluster with the largest number of members from the overlapping set. If multiple clusters are of the same size, the one with the highest density is retained.

Figure 11:
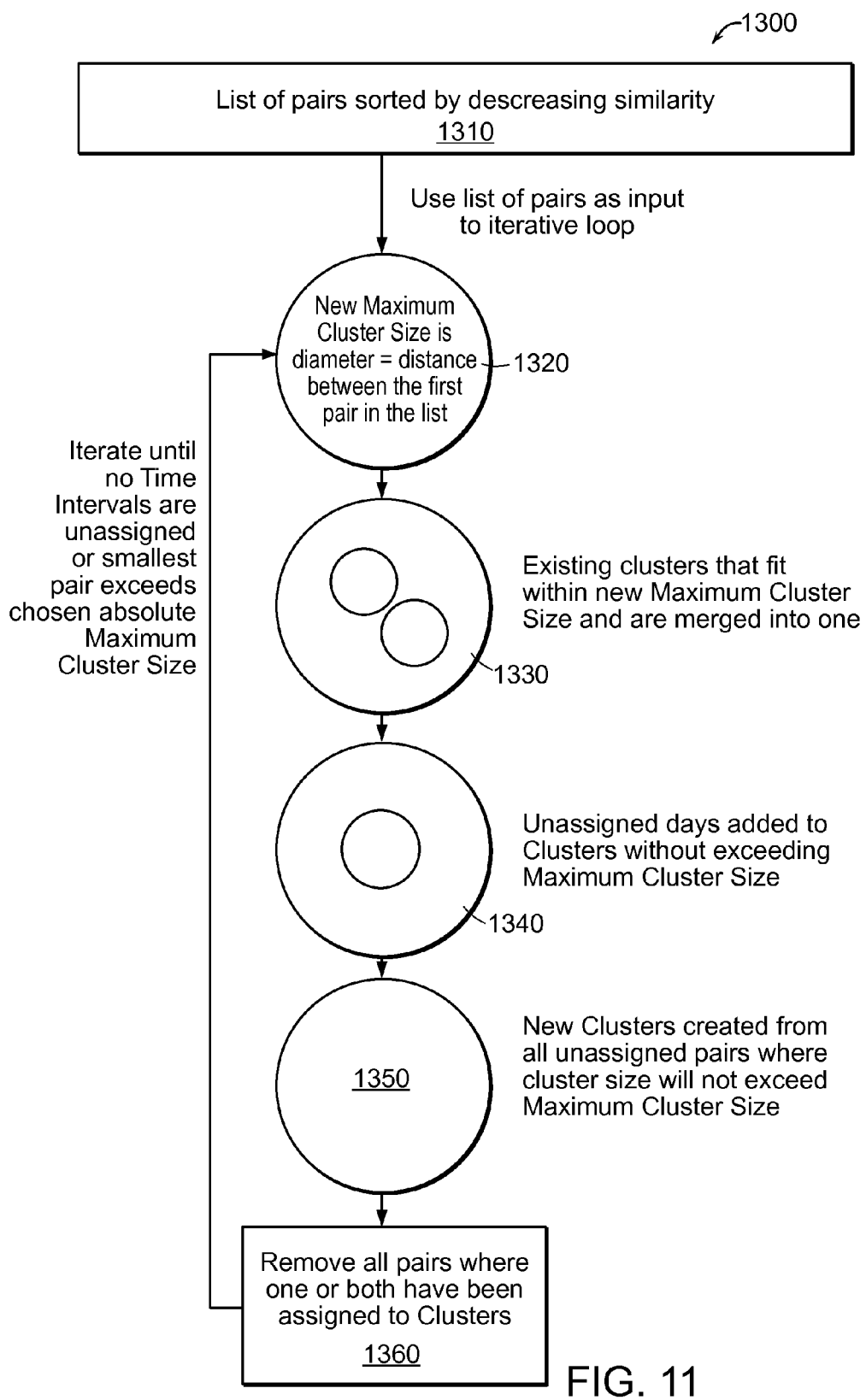
FIG. 11 is a flowchart for a particular heuristic method to identifying patterns.

FIG. 11 is a flowchart for a particular heuristic method to identifying patterns. The heuristic method 1300 for pattern detection starts at 1310 by creating a list of all possible pairings of time intervals sorted by similarity, smallest first.

The rest of the algorithm runs in a loop that starts at step 1320 with picking the similarity of the first pair in the list as a current maximum cluster size for this iteration. Viewed graphically, the new maximum cluster size is a diameter equal to the distance between the first pair in the list. At step 1330, the method then determines if any existing clusters can be combined into a single cluster without exceeding the current maximum cluster size. Those that can are merged. At step 1340, the method then determines if any of the time intervals (e.g. days) that are not already in a cluster can be added to any of the existing clusters without exceeding the current maximum cluster size. Then at step 1350, all pairs from the list that have similarities not greater than the current maximum cluster size, and where none of the two are members of a cluster, are added to the clusters. The final step 1360 of the iterative loop is to remove all pairs where at least one member of the pair has been assigned to clusters. The iteration stops when the similarity of the smallest pair in the list exceeds the maximum cluster size, or there are no more unassigned time intervals.

Regardless of which method is employed, every detected cluster is the source for a pattern. In particular, each pattern is the sensor value averages from all members of the cluster across each time slice in the time interval. The collections of patterns are stored by the server and transferred to the LEOs at an appropriate time, such as over a weekend. Each LEO then begins using the patterns in its matching algorithms.

Figure 12:
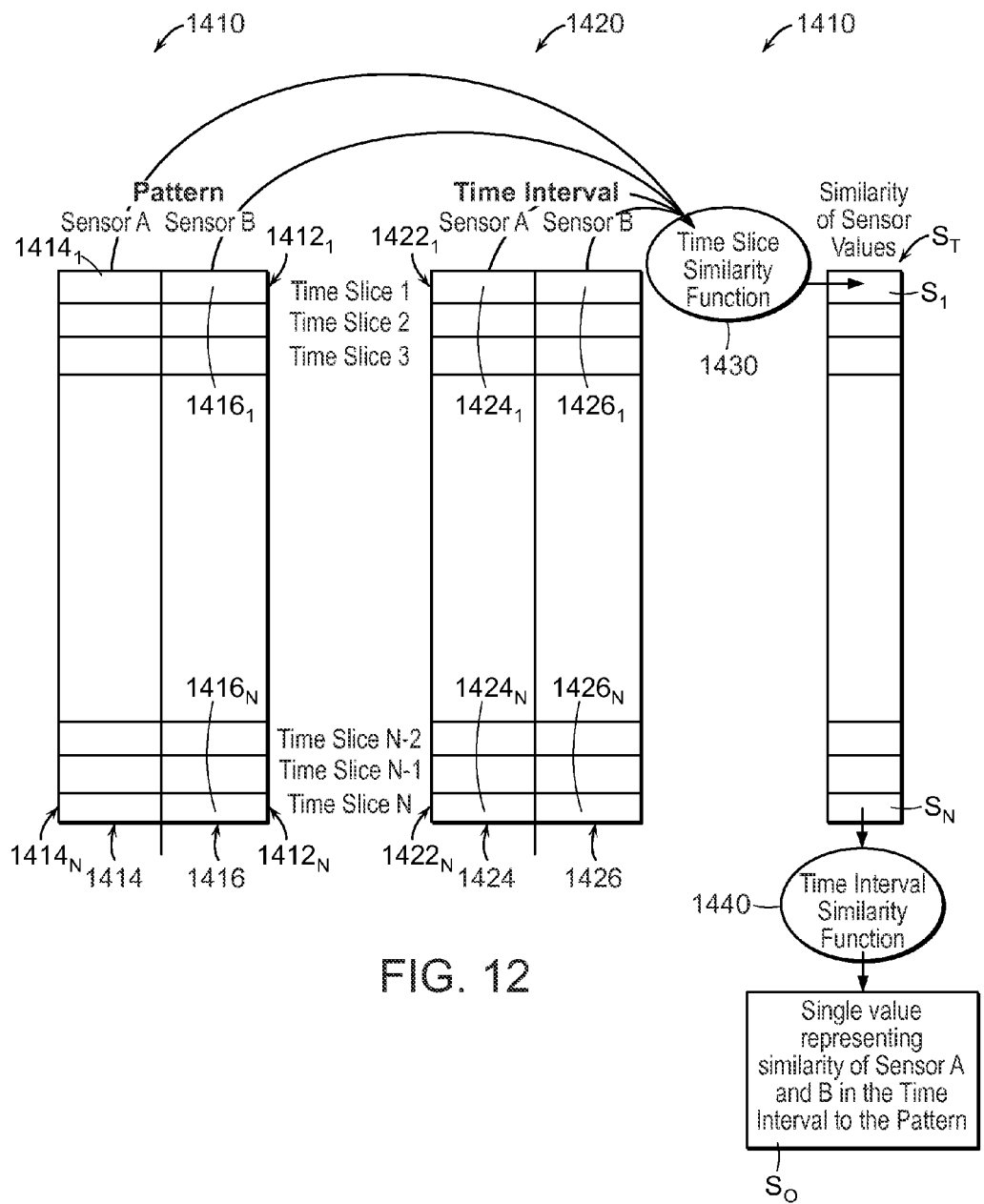
FIG. 12 is a block flow diagram for a particular pattern matching algorithm on a LEO of FIG. 1.

FIG. 12 is a block flow diagram for a particular pattern matching algorithm on a LEO of FIG. 1. As shown, the matching process 1400 compares a pattern 1410 to a current time interval 1420 with an algorithm similar to the one used to compare time intervals with each other for pattern recognition in FIG. 9. Instead of comparing historical data, pattern matching compares the current stream of sensor data values to the recognized patterns.

For pattern matching, the general time slice similarity function is:

$$S_T = \sqrt{\frac{\sum_{I=1}^{M} ((R_{IP} - R_{IT}) * (1 - ((\frac{(T_N - T_T)}{T_S}))))^2}{M}}$$

where $S_T$ is the calculated similarity for time slice T, $R_{IP}$ is the normalized average sensor value for sensor I in time slice T for the pattern, $R_{IT}$ is the normalized average sensor value for sensor I in time slice T for the time interval, M is the number of sensors chosen for the calculation, $T_N$ is the time of the current time slice relative to the start of the time interval, $T_T$ is the time of the time slice being measured relative to the start of the time slice and $T_S$ is the length of a time slice.

One difference between this formula and the one used for pattern detection is that differences are weighted by the time difference between the start of the current time slice and the start of the time slice being measured. The current time slice difference is given a weight of one, and a time difference of a full time slice away is given a weight of zero.

The weighting can be made non-linear by applying an exponent to the weighting factor as below.

$$S_T = \sqrt{\frac{\sum_{I=1}^{M} ((R_{IP} - R_{IT}) * (1 - ((\frac{(T_N - T_T)}{T_S}))^P))^2}{M}}$$

where P is the exponent applied. The weighting makes differences that are recent in time carry more weight than differences that are more distant in time.

The overall similarity of the pattern to the time interval is $$S_O = \sqrt{\frac{\sum_{T=1}^{N} S_T^2}{N}}$$

where $S_T$ is the similarity of sensor readings for time slice T, and N is the total number of time slices in a time interval.

Figure 13:
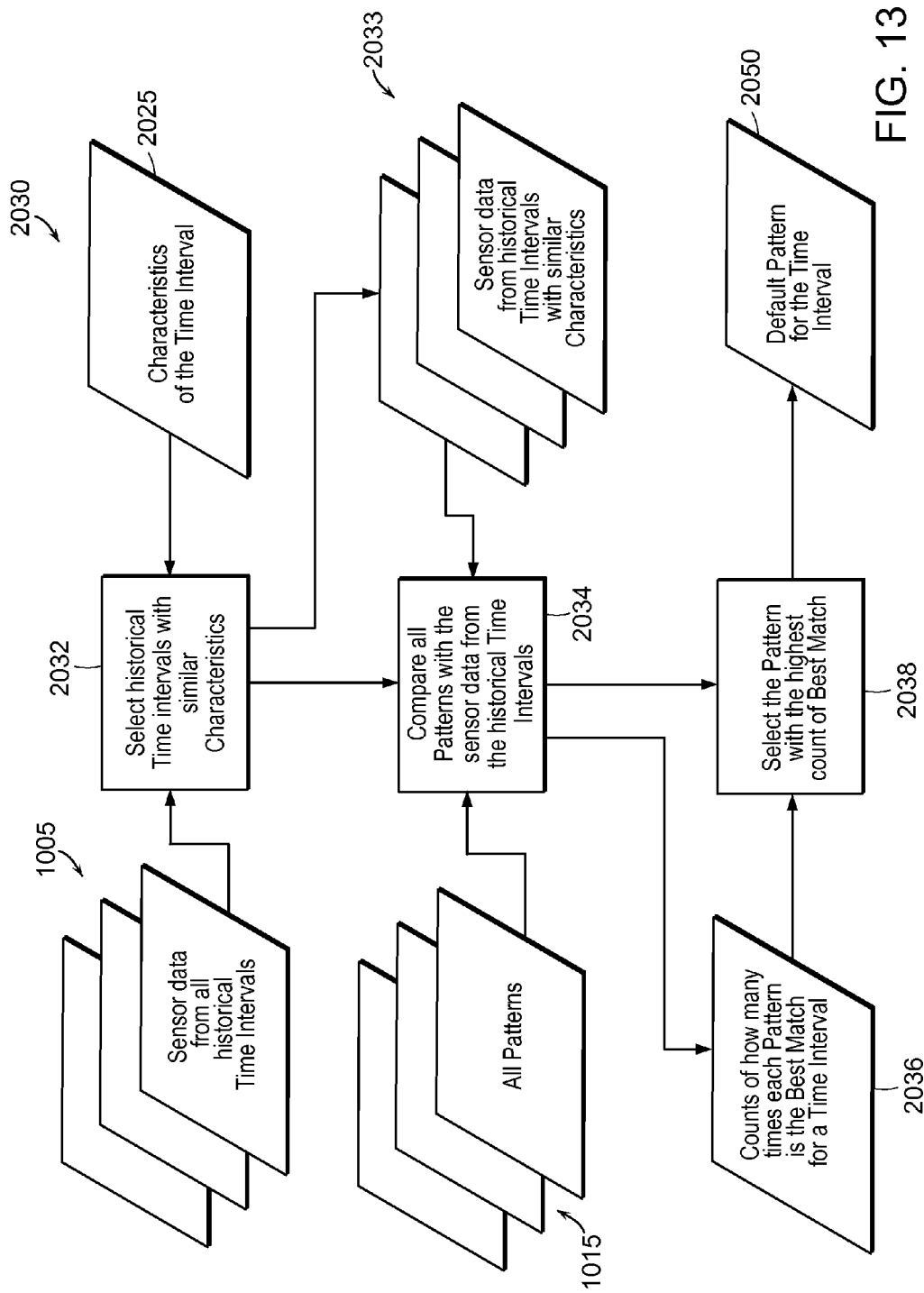
FIG. 13 is a flowchart for the detailed process of determining the default pattern for a time interval in FIG. 8.

FIG. 13 is a flowchart for the detailed process of determining the default pattern for a time interval in FIG. 8. Typically, time intervals will have characteristics 2025 that are relevant to energy management as outlined above. First, the sensor data from all historical time intervals 1005 and the characteristics of the time intervals 2025 processed at step 2032 to select historical time intervals with similar characteristics 2033. For characteristic values (e.g., the day of the week), patterns are ranked at step 2034 by comparing each pattern 1015 with sensor data for each historical time interval having similar characteristics 2033.

At step 2036, the process counts the number of times a particular pattern is the best match for a time interval. Then, at step 2038, the pattern that has the highest count of being the best match becomes the default pattern for the given time interval 2050.

For each time interval characteristic, the pattern with the highest rank becomes the default pattern for that characteristic. The default patterns, the characteristics, and the number of times the patterns is the best match for the characteristic are stored for prediction of sensor values. It should be appreciated that the choice of the default pattern is dynamic and can thus change as frequently as every time slice.

Figure 14:
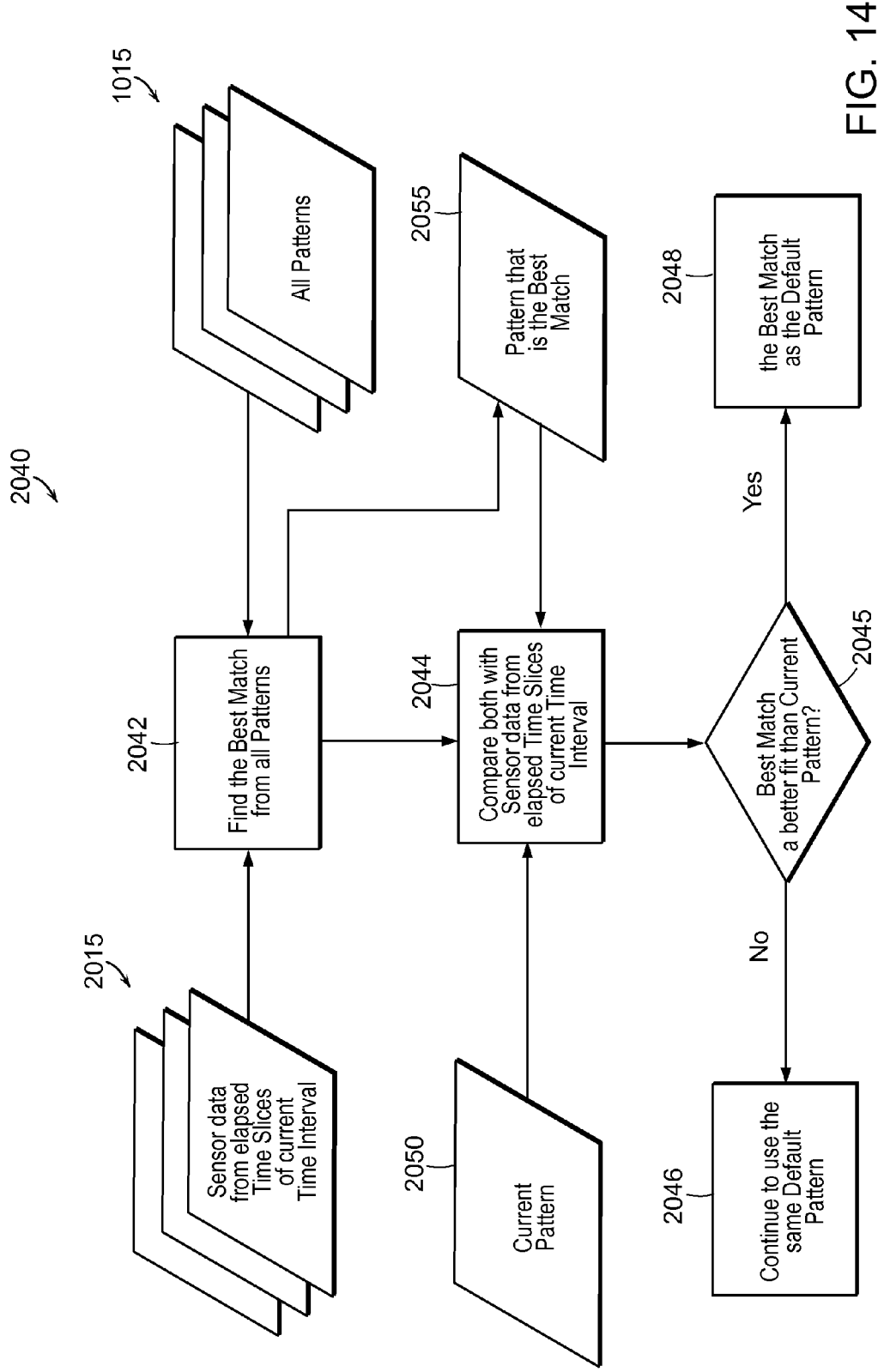
FIG. 14 is flowchart for the detailed process of dynamically updating the default pattern from FIG. 8.
Figure 15:
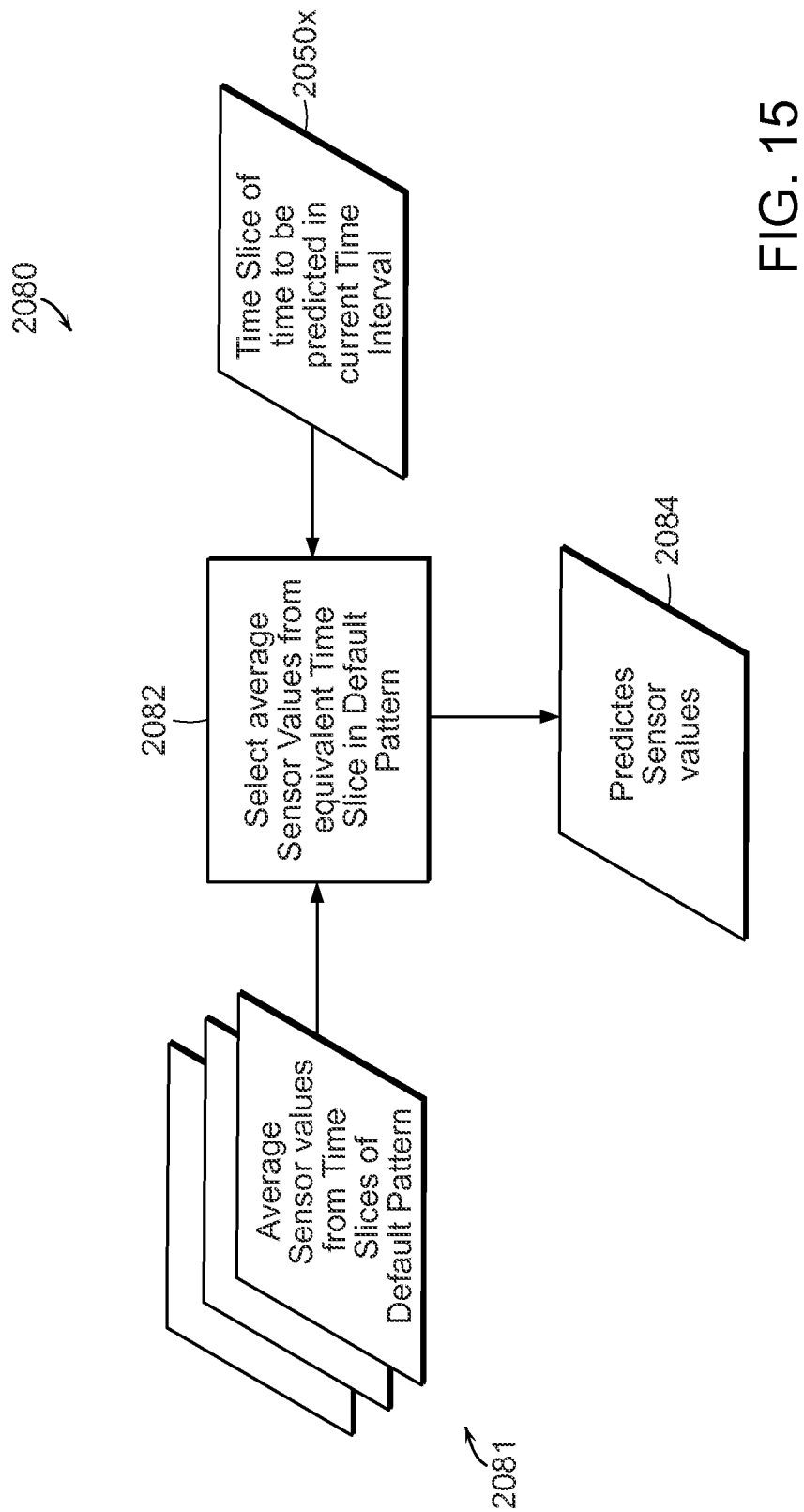
FIG. 15 is a flowchart for the detailed process of retrieving a predicted value for a sensor from FIG. 8.

FIG. 14 is flowchart for the detailed process of dynamically updating the default pattern from FIG. 8. The process 2040 begins at step 2042, where at the start of each time slice, the average sensor values for the current time interval 2015 are matched against all patterns 1015 and the pattern with the best match is stored 2055. At step 2044, the stored best match 2055 is compared to the stored current pattern 2050. At step 2045, if another pattern is a better match than the currently selected current pattern 2050, the pattern with the best match 2055 becomes the new current (i.e. default) pattern at step 2048; otherwise the current pattern 2050 is continued as the default pattern at step 2046. This approach ensures that the current pattern reflects actual sensor data and is adaptive to changes in behavior and usage. In particular, the system has the ability to recognize when an exception has occurred and to change the current pattern to a more appropriate one FIG. 15 is a flowchart for the detailed process of retrieving a predicted value for a sensor from FIG. 8. To predict a future sensor value at step 2084, the average sensor value stored for the current pattern's time slice 2081 is used at step 2082, where the predicted time slice 2050$_X$ is that time slice in the current time interval to be predicted. Note that this is an average, and depending on the sensor, interpretation of the average sensor value meaning can vary. For example, for an occupancy sensor, a value of 0.5 may indicate that occupancy is likely to start or end half-way through the time slice.

How far out in the future to retrieve a predicted sensor value is dependent on the actual application. For HVAC, the time needed to bring the building to the desired temperature is the major factor. This time will vary with the thermal properties of the building and with the range that the temperature needs to change by, which, in turn may vary by the outside temperature. The times can also be different for heating and cooling.

While the above pattern detection and matching processes have been described with reference to time slices, the horizontal dimension can be other metrics other than time. An example of non-time based patterns is monitoring how a failure of vehicle parts relate to the mileage of the vehicle. That is, if the failure of various parts are mapped into the mileage across a large population of vehicles, patterns will emerge. The emergence of new patterns, occurring at lower mileages, may indicate deteriorating quality of a part.

To accomplish balanced energy efficiency, a particular embodiment of the system includes logic to understand how comfortable the occupants of a building are, and how comfortable they should be. The determination of how comfortable occupants "should be" includes an element of corporate or institutional policy that must be considered, and is accounted for in the system algorithms as well. In particular, the system uses occupant feedback to determine the comfort status of groups of occupants, and uses that as a factor in governing the settings of building subsystems to optimize group comfort, while balancing against policy driven energy savings requirements.

By employing feedback, people are treated as fuzzy sensors (e.g. "too hot", "too cold", "just right"). Feedback then is thus data, from which the system can extract information, and treated as complaints. Thus feedback is actively solicited, unlike complaints, because more data is better.

Figure 16:
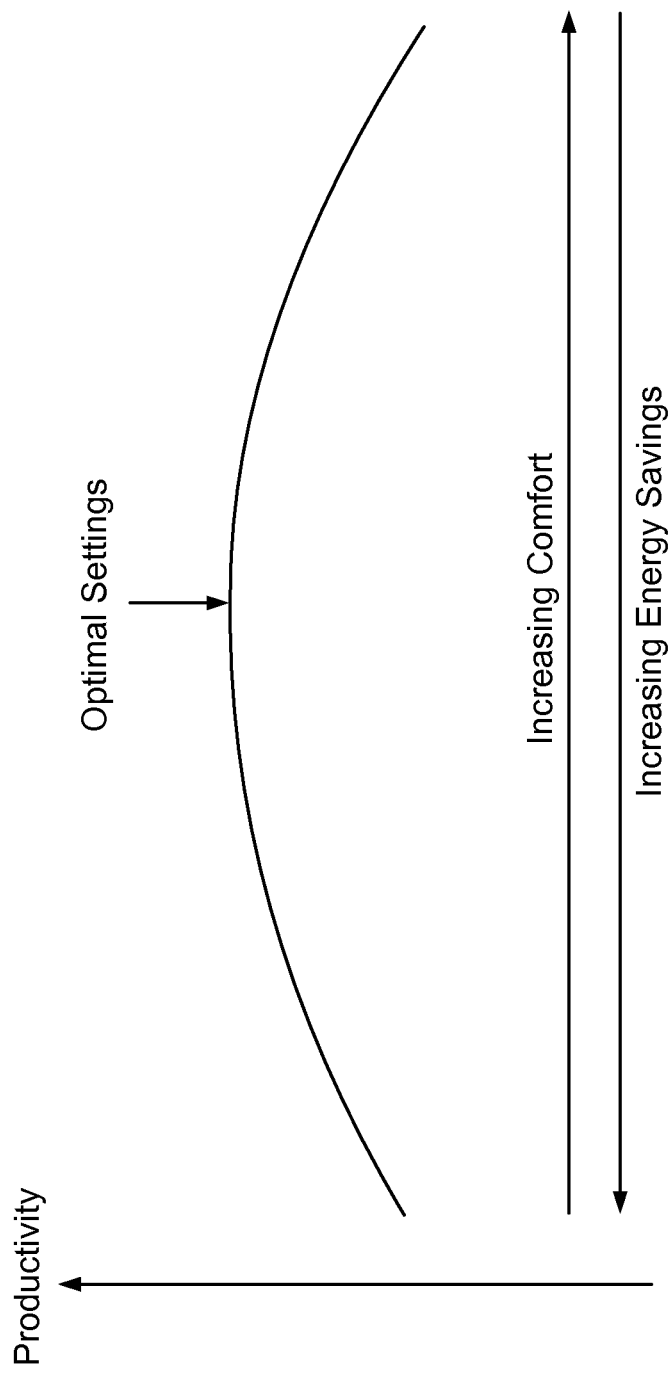
FIG. 16 is an exemplary graph illustrating the trade-offs in balancing energy saving with occupant comfort.

FIG. 16 is an exemplary graph illustrating the trade-offs in balancing energy saving with occupant comfort. As shown, increasing comfort may decreases energy efficiency. A goal of the system is to attempt to maximize productivity by balancing comfort with efficiency, while recognizing that some increased energy costs may be overcome by increased productivity.

In most buildings, efficient facilities management requires striking a balance between reducing energy consumption and optimizing occupant comfort. In environments such as businesses, institutions and agencies, the comfort of an employee is an important factor in their overall job satisfaction and has a direct impact on their morale, productivity and employee retention. Whereas reducing energy consumption means saving money, one cannot lose sight of the costs associated with unhappy employees. The costs associated with reduced productivity or low rates of retention can be substantial, and have the potential to outweigh energy savings gained at the expense of comfort. Therefore, finding the perfect balance between reducing energy consumption and keeping people comfortable is an important strategic goal of most commercial entities.

A particular facilities management system includes the ability to measure occupant comfort and apply the results to facilities management. The system facilitates and encourages occupant feedback by providing easy and entertaining feedback interfaces on familiar devices such as smart phones and personal commuters, and by responding to the occupant's feedback in a way that makes the occupant understand the functioning of the system and remain eager to participate. Encouraging full and active occupant feedback participation allows for accurate statistical analysis and reliable determination of group comfort.

Subsystems will have overlapping, but often different control zones. For example, a room may be the entire control zone for lighting control, but one of several rooms that are a single HVAC control zone. When feedback is received, the location of the feedback is mapped into all of the control zones that the location is part of. Typically, but not necessarily, feedback for a given subsystem is handled independently of feedback from other subsystems. Feedback that an occupant finds that a space is too brightly lit may affect the lighting or window shade settings, but will not affect temperature handling.

Occupant feedback is implemented through a cycle of collecting feedback for a given period of time, the measurement period, then analyzing the feedback to identify differences between group comfort and current subsystem settings adjustments, and finally making adjustments to subsystem settings as appropriate. The cycle repeats continuously as feedback is received.

Figure 17:
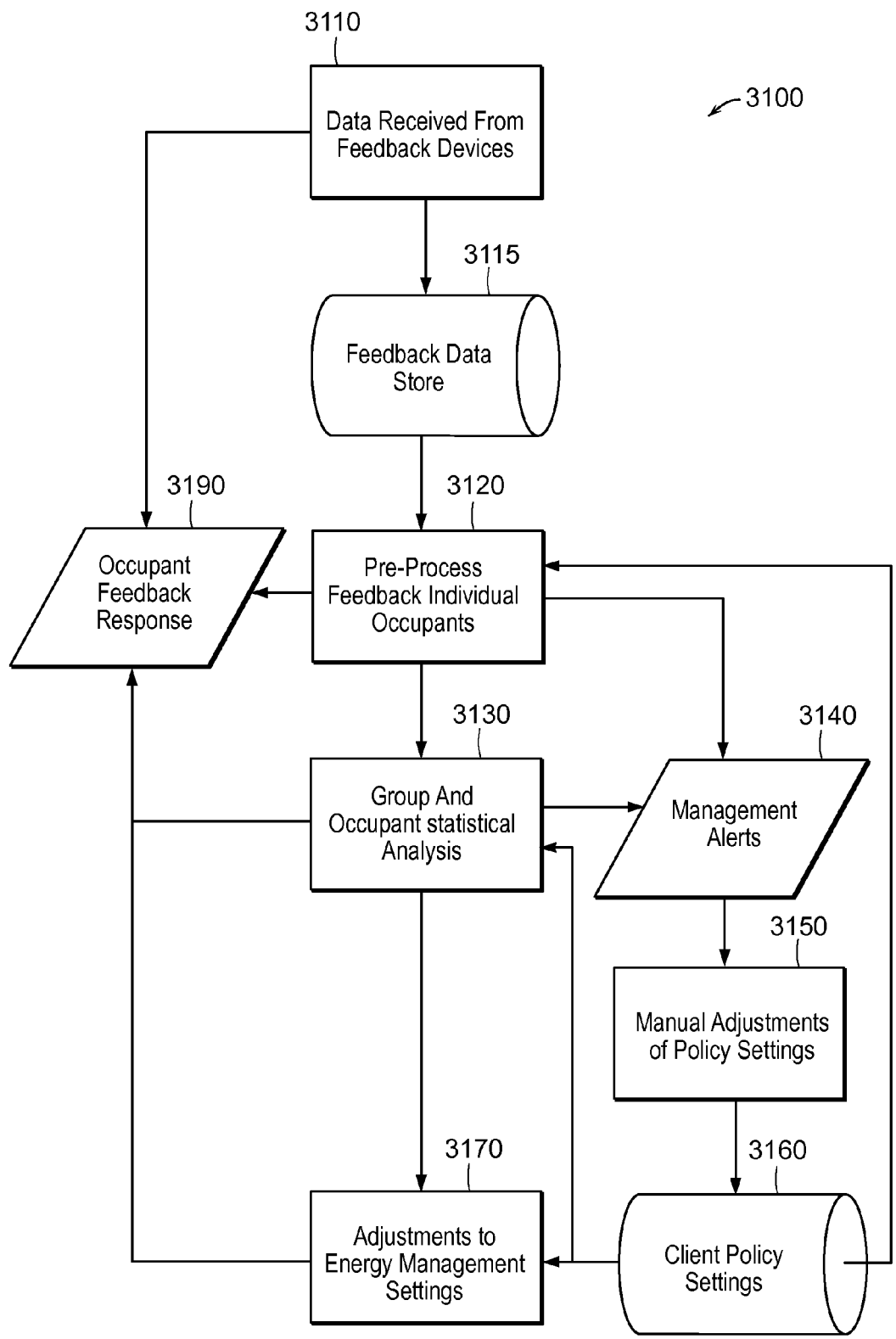
FIG. 17 is a flow diagram illustrating the processing of feedback for a control zone within a subsystem.

FIG. 17 is a flow diagram illustrating the processing of feedback for a control zone within a subsystem. The process 3100 can be viewed as a Collection-Analysis-Adjustment cycle.

The collection phase addresses collecting feedback received from feedback devices at step 3110 for a fixed time period. The measurement period length for each collection phase is determined on a customer-by-customer basis to account for:
- the cycles of space occupancy and use;
- the desired frequency of feedback-based adjustments; and
- the quantity of feedback collected during each collection phase.

It should be noted that too short of a measurement period may result in undesirable fluctuations in settings based on too few instances of feedback. However, too long of a measurement period may result in undesirable delays between feedback and noticeable changes in subsystem settings or feedback response. System reports can assist the customer in selecting the most appropriate measurement period. The default setting for a new customer is typically 24 hours.

Feedback for a measurement period is stored in a database 3115, including the following information:
Required data:
  Date and time of feedback
  Subsystem related to the feedback:
    Temperature
    Light
    Glare
    Humidity
    Noise
  Feedback value (a value representing the feedback)
  The control zone from which the feedback was taken
  Associated subsystem settings at the time the feedback was provided, such as:
    Thermostat set-points and dead band
    Lighting status:
      On
      Off
      Percentage dimmed
    Window shade position status
    Humidifier/dehumidifier status
    Ventilation fan status
Optional data:
  Identity of the occupant providing the feedback
  Sensor data for the area of feedback, if available, such as:
    Temperature
    Light level
    Humidity level
    Noise level The user interface typically supports simultaneous feedback on multiple subsystems. Each instance of feedback will create a separate record in the database relating to the associated subsystem.

For the analysis phase, feedback is parsed for analysis according to associated subsystems and control zones. Feedback for each subsystem is analyzed independently of the feedback for other subsystems. Within each subsystem, feedback for each control zone is analyzed independently of other control zones.

Feedback is pre-processed from individual occupants at step 3120. The treatment of multiple instances of feedback from individual occupants is defined by the customer's policy settings 3160. Settings may be collective, applying to all occupants, or individual, applicable to specific occupants. The purpose is to ensure that occupant feedback is treated "fairly", as determined by the customer, and to eliminate intentional manipulation of the system.

Multiple instances of feedback from a single individual for a specific subsystem and control zone during a single measurement period can be handled in several ways:
- give each feedback instance the same weight as a single feedback instance normally would have;
- take the average of all instances of feedback and use this value as a single feedback instance;
- take the median value of all instances of feedback and use the value of this as a single feedback instance; or
- take the feedback value most frequently given during the feedback period and use it as a single feedback instance.

It is recognized that the pre-processing of feedback may raise alerts 3140 to the customer. For example:
- If an occupant supplies inconsistent feedback, such as registering both too cool and too warm during a measurement period, this may raise an alert, and the customer may choose to take action at step 3150, such as:
  - asking the occupant about the circumstances that gave rise to the feedback; or
  - defining a policy for the specific occupant.

The feedback from specific occupants for specific subsystems and control zones can be given different levels of weight as defined by customer policy. For example, the customer may decide that feedback from residents is given more weight than feedback from non-residents, or that professors are accorded a higher weighting than students. Such weighting can be included in the calculation of adjustment factors for a given subsystem or control zone.

After the feedback from individual occupants has been processed, then all feedback is analyzed statistically at the group level at step 3130 for:
- Distribution
  - Average
  - Median
  - Standard deviation
  - After elimination of a group of percentile outliers (typically 90th percentile):
    - Average
    - Median
    - Standard deviation
- Trends
  - Relative to sensor data
  - Relative to subsystem settings The statistical analysis may also raise alerts 3140 to the customer that indicate that facility systems are faulty or out of calibration, such as:
- Feedback about being too cold in spite of high thermostat settings may indicate:
  - Open windows
  - Faulty thermostat calibration
  - Clogged filters
- Feedback about being too noisy may indicate:
  - Faulty HVAC air handlers
  - Doors left open, which should be closed Specific occupants consistently providing feedback that is divergent from the majority of occupants may indicate:
- The occupant may need to be provided with things that improve their comfort, such as:
  - Space heaters
  - Personal fans
  - Sweaters
- The occupant may need to be relocated to spaces where the settings would make them more comfortable, such as:
  - Less glare
  - Higher or lower temperatures
  - Less noise The following feedback data received from a group of individuals is an illustrative example:

| Comfort | Value | Count |
| --- | --- | --- |
| Extremely cold | −4 | 1 |
| Very cold | −3 | 1 |
| Cold | −2 | 2 |
| Cool | −1 | 10 |
| Comfortable | 0 | 20 |
| Warm | 1 | 15 |
| Hot | 2 | 4 |
| Very hot | 3 | 1 |
| Extremely hot | 4 | 0 |

In this example the average feedback value is 0.56 ("comfortable" with a small "warm" bias), and the median feedback is "comfortable".

If the 10% outliers are removed, the data becomes:

| Comfort | Value | Count |
| --- | --- | --- |
| Extremely cold | −4 | 0 |
| Very cold | −3 | 0 |
| Cold | −2 | 0 |
| Cool | −1 | 10 |
| Comfortable | 0 | 20 |
| Warm | 1 | 15 |
| Hot | 2 | 4 |
| Very hot | 3 | 0 |
| Extremely hot | 4 | 0 |

Now the average feedback value is 1.44 ("warm"), and the median feedback is "warm".

With the outliers removed, there is a significant bias towards "warm" in the feedback. Depending on the customer's policy settings, the season, the weather, or the influence of solar heating, etc., this might warrant dropping the thermostat's high set-point in summer, causing more energy consumption for air conditioning, or dropping the thermostat low set-point during the heating season, leading to a reduction in energy consumption for heating.

In addition, occupant-level statistical analysis is also performed at step 3130 for:
- Distribution
  - Average
  - Median
  - Standard deviation
  - After elimination of specific percentile outliers (typically ninetieth percentile)
    - Average
    - Median
    - Standard deviation
- Trends
  - Relative to sensor data
  - Relative to subsystem settings The following aggregate feedback received from an individual is another example:

| Comfort | Value | Count |
| --- | --- | --- |
| Extremely cold | −4 | 1 |
| Very cold | −3 | 2 |
| Cold | −2 | 4 |
| Cool | −1 | 10 |
| Comfortable | 0 | 20 |
| Warm | 1 | 6 |
| Hot | 2 | 2 |
| Very hot | 3 | 1 |
| Extremely hot | 4 | 0 |

From the data, the average feedback from this individual Occupant is −1.66 ("cool") and the median value is "comfortable". If we again remove 10% outliers, the average becomes −2 ("cold") and the median remains "comfortable". Depending on the customer's policy settings, an alert may be issued that this occupant typically feels too cold.

For the adjustment phase 3170, the results of the statistical analysis from step 3130 and customer policy settings 3160 are fed to rules that manage the settings for the controls that adjust the subsystems and control zones just analyzed. Examples of such rules are:

- If more than a specified percentage of the processed feedback reports the control zone as being uncomfortably hot, adjust the thermostat set-points a predetermined number of degrees down.
  - Customer policy may limit this rule to specific levels of occupancy. For example: Do not adjust set-points during periods of no or low occupancy.
- Adjust outside shades to block more direct sunlight if the average processed feedback is uncomfortable glare.
- Adjust outside shades to admit more direct sunlight if no reported glare discomfort, and if daylight harvesting allows the lowering of electric lighting levels.

Note that the adjustments typically will create an optimum balance between occupant comfort and energy consumption.

The system also includes a provision for policy override because some amount of discomfort may be desirable from a business perspective due to the potential energy savings. Thus policy adjustment mechanisms are provided to over-ride optimization to conform to such business policy.

An occupant feedback response 3190 is provided at all stages of feedback processing. The types of response and when a response should be provided to the occupant who provides the feedback are driven by rules that take customer policy settings as input.

From the collection stage at step 3110, an immediate response is provided to the occupant to show that each instance of feedback has been received and will be processed. Responses may also include incentives or historical information, such as:

- a rating of the occupant that indicates how often he/she provides feedback;
- adjustments that may have been made in response to previous feedback from the occupant; and
- rewards for particularly frequent or substantive participation.

From the analysis stage, all steps can result in responses to specific occupants, to groups of occupants, or all occupants, depending on specific conditions. As a result of pre-processing of feedback at step 3120 from individual occupants, the occupants may be provided a feedback response, such as:

- reassuring occupants who have provided multiple instances of feedback that their feedback will be processed, and to be patient; and
- informing occupants who appear to be attempting to manipulate the system that there are other ways to address their discomfort.

As a result of the group and occupant statistical analysis at step 3130, a feedback response may be generated both to individual occupants and to groups, such as:

- The occupants may be provided feedback responses that indicate group comfort levels combined with energy consumption data.
- Individual occupants may be given feedback responses that they are feeling discomfort when others are comfortable, suggesting available remedial measures that the occupant may take him/herself, or a response may be forwarded to a manager for action.
  - Remedial measures that the occupant may be able to take himself or herself:
    - Wearing warmer or cooler clothing.
    - Closing manual shades.
  - Potential management action:
    - Issuance of equipment that may make the occupant more comfortable.
    - Relocating the occupant to a workspace that would be more comfortable.

From the adjustments stage at step 3170, energy management setting adjustments can generate occupant feedback responses, such as informing all affected occupants of adjustments that have been made in response to occupant feedback, with information about the impact of the adjustment on comfort levels and energy consumption.

Figure 18:
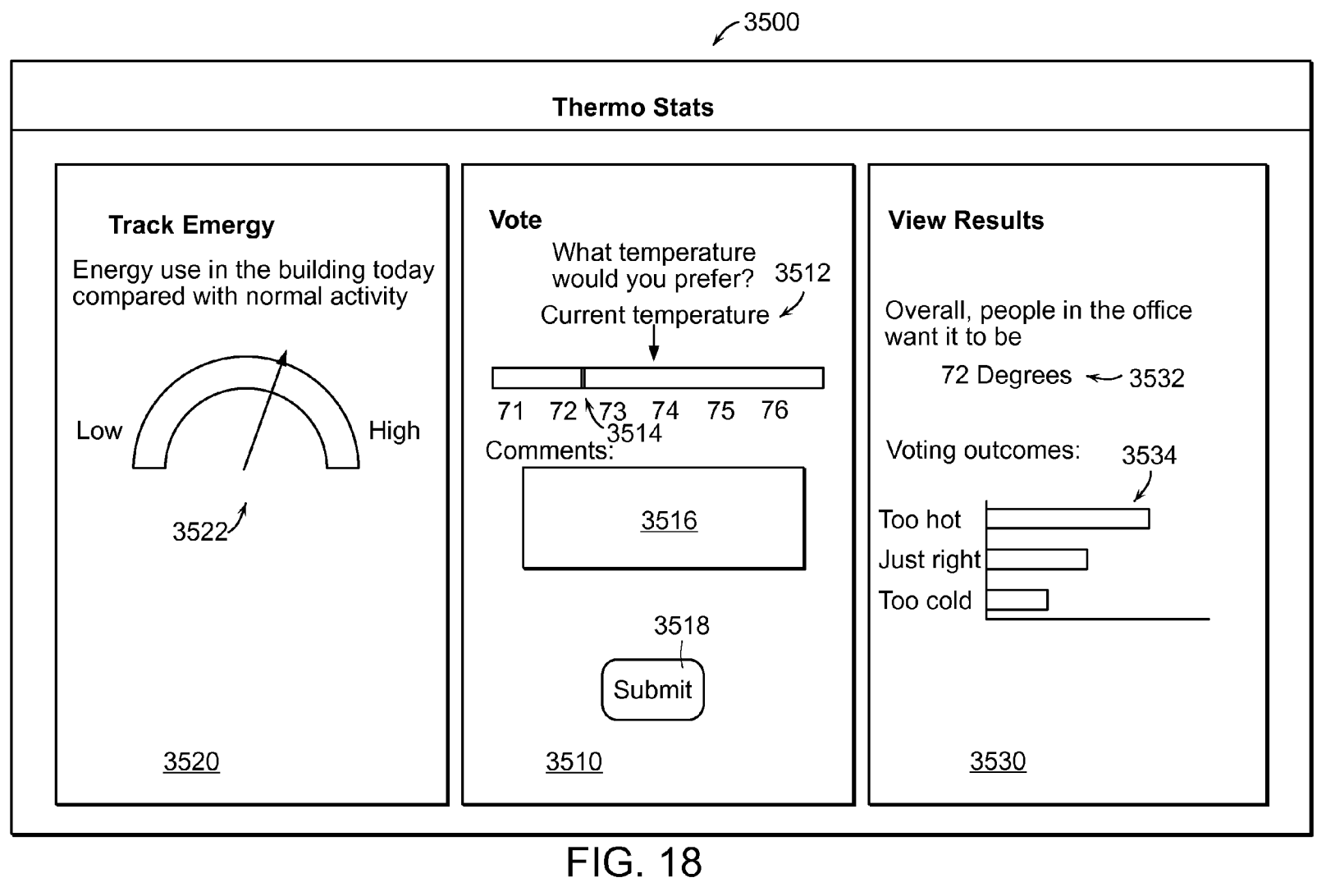

FIG. 18 is an exemplary user interface for feedback devices. As shown, the feedback interface 3500 is a window that includes a voting frame 3510, a energy tracking frame 3520, and a results frame 3530. In the voting frame, the user is shown a scale with the current temperature 3512 and the user can vote on the perceived comfort level with the current temperature using a slider 3514 and can add comments 3516. By way of feedback, the user can also view results from others in the zone or other locations, such as the temperature that others would like it to be 3532 and the voting outcomes for today 3534. The user can also track the building's energy usage by a displayed temperature gauge 3522 ranging from low to high. Additional encouragement to vote can be provided by offering coupons or further applying gaming theory. By providing such feedback, it is hoped that employees will be willing to sacrifice some comfort for energy efficiency.

Returning to FIG. 1, each LEO 20-1, 20-2 and the central server 80 include a respective rules engine 22-1, 22-2, 82 for processing data. While traditional programming could be used, the rules engines create a programming environment that is extremely close to a number of real-world situations. By using a rules engine, the programmer can focus on the business problem and not worry about traditional programming concepts such as program flow.

A rules engine, in accordance with particular embodiments of the invention, operates on a set of rules, specified as "when <event> do <action>". The rules engines detect the occurrence of events and automatically execute the matching actions for rule-specified events that have occurred. If an action creates the conditions specified by one or more events, or possibly the same rule, they, in turn are executed until no more events are detected. In the terminology of rules engines, a rule is triggered when an event fires.

Ideally, the rules engine itself consumes few resources and leaves most of the computer's resources to execution of the rule actions. In practice, however, rules engines often consume large amounts of resources in the process of detecting events and triggering rules.

The most complex issues that contribute to rules engine overhead are detection of events and chaining to rules, and state management.

For the detection of events and chaining to rules, the more general the rules engine, and the more complex logic is allowed in the definition of events, the more difficult, and in turn, resource consuming does the rules engine's logic for this process become. In the terminology of artificial intelligence, a rules engine can be forward chaining, in which cases it detects an event then examines whether any rules exist that should be triggered by the event, or backward chaining, in which case the rules engine constantly watches the environment for conditions that satisfy the rule triggering logic.

Management of state by the rules engine is important and potentially very complex. As a result, most rules engines are single-threaded—only one rule action can execute at a time. Multithreading can be desirable if some events take a long time to complete.

The order in which rule actions execute can also be important, if some event triggers two rules, the final state can be different depending on the order in which the rule actions execute. If the order is predictable the rules engine is deterministic and if it is not, the rules engine is non-deterministic.

An interesting case is the scenario where an event fires a rule, but for some reason the conditions defining the event are not true at the time the action executes. A real-world example is that a rule can specify that a thermostat should be set at a comfortable level when an office is occupied, and another rule states that different thermostat settings should be employed when the office is unoccupied. If the office becomes occupied and triggers the first rule, but the event is not executed until the office becomes unoccupied, then the thermostat is adjusted unnecessarily. The second rule will fire when the office becomes unoccupied and if the rule actions execute in the order in which the rules were fired, the thermostat will be set correctly after the second rule performs its action.

The rules engines are frequently triggered by periodic events. As such, the system uses rules to maintain time data in a heartbeat table (not shown) and to process actions in response to changes in the time fields.

In accordance with a particular embodiment of the invention, a rules engine addresses the issues described above by leveraging ACID relational database technology 24, 84 (FIG. 1) in the creation of rules engines. Specifically:

Limiting the logic of the rule-triggering to "changes in the data contained in one or more relational databases", which enables the rules to be very efficient in forward chaining by employing database triggers to alert the rules engine when rule-triggering modifications have been made.

Storing all of the state-critical data in one or more relational databases and using the database engine to maintain consistent state and ACID compliance.

In a particular embodiment of the invention, the ACID database is provided by MySQL, version 5.2, paired with the InnoDB storage engine. The integration of ACID-compliant database technology has enabled a number of other significant features and benefits. To maximize leverage of database technology and to make the rules engine as useful as possible in a real-world application setting, the particular rules engine has the following features:

1. Events are limited to changes in value to any of a number of relational database columns. A single event can specify columns in several tables and multiple columns in a single table. Insertion of new rows and deletion of rows are considered changes in value.
2. A rule event is tied to a triggering action happening to a specific row in a table. If triggering events happen to multiple rows in a table, they generate separate calls to the rule action. The rule action knows the specific table, row and column that triggered it.
3. Rule actions must assume that the state of the system may have changed between the event and the time the action is performed, including changes to database columns that trigger the event.
4. If multiple event-triggering columns for the same rule are changed simultaneously they will cause multiple executions of the rule event. One for each column that had its value changed.
5. All actions are transactional and ACID:
   Rule actions are Atomic, meaning that they either complete, or all changes to the database are rolled back if the actions fail, for any reason.
   The data in the database is Consistent, meaning that all actions see a consistent state.
   All actions are Isolated, meaning that if an action modifies database data used by some other action, the second action will be suspended until the first action completed.
   All actions are Durable, meaning that changes to the database performed by an action are guaranteed to survive any failure.
6. Rule triggering and rule action execution is asynchronous:
   Rule trigger detection and rule action execution run independently of one another, the former feeding a queue and the latter consuming it.
   Events are not triggered by a rule until it completes and commits.
7. All rules have an assigned priority:
   If single-threaded rule execution is chosen, rule action execution order is strictly by increasing priority and increasing triggering timestamp.
   If multi-thread rule execution is chosen, each thread chooses rules to execute in the order of increasing priority and increasing triggering timestamp, but since a thread can be limited to a range of priorities and the nature of multi-threading, overall rule action execution is not guaranteed to be in increasing priority and increasing triggering timestamp order.

The particular rules engine applies the capabilities of modern ACID-compliant relational databases to the domain of rules engines in a unique and innovative manner to implement a rules engine with a number of unique and desirable features:

1. Triggering a rule in response to changes to specific columns in any row of specific tables.
2. Scaling of rules to work efficiently on massive amounts of data by allowing one rule to operate on all rows of database tables containing potentially massive amounts of data. In effect, the rules engine will scale as efficiently as the database engine it leverages.
3. Multiple instances of the same rule, triggered by different rows or columns, can execute in parallel.
4. Multi-threaded triggering and execution of rules.
5. Asynchronous triggering and execution of rules.
6. Rule triggers and rule actions triggered can be guaranteed against loss by any failure short of a catastrophic event.
7. ACID compliance:
   a. Atomicity of rule execution;
   b. Consistency of overall system state;
   c. Isolation of one executing rule from other executing rules; and
   d. Durability of rule execution.
8. Failing rules are retained and can be restarted after the cause of the failure has been corrected.
9. The balance of throughput and responsiveness of rules can be managed by assigning priorities and having multiple execution threads assigned to subsets of priorities.

Figure 19:
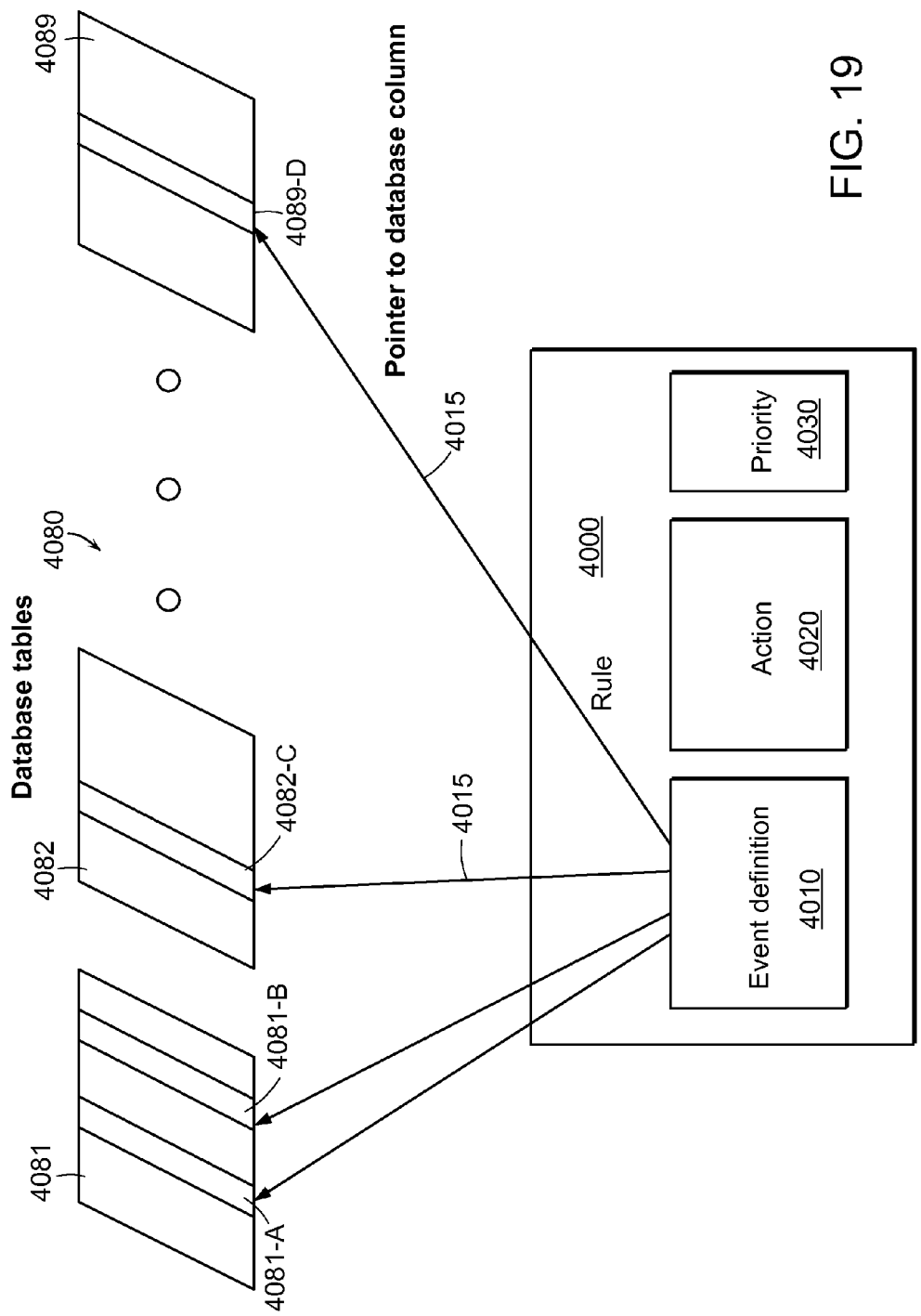
FIG. 19 is a block diagram of a rule definition in accordance with particular embodiments of the invention.

FIG. 19 is a block diagram of a rule definition in accordance with particular embodiments of the invention. As shown, a rule 4000 is defined by specifying three items:
1. the event definition 4010, which is the data that will trigger the rule;
2. the action 4020 the rule should perform when triggered; and
3. the priority of the rule 4030.

Triggering data is data that, if changed by database inserts, deletes or updates, will trigger rules. The definition includes a list of table and column pairs. The list of tables can include multiple tables 4081, 4082, . . . , 4089 and multiple columns 4081-A, 4081-B, 4082-C, . . . , 4089-D with no restriction other than all the tables must be under the control of a single transaction manager. Pointers 4015 are used to access the table columns.

The action to be performed when triggered is machine-executable code that must be run after the rule is triggered.

Rules are created by adding entries to a rule definition table that contains the identity of the rule, the trigger definition, the action code and the rule priority. Depending on the implementation, any or all of these fields can be pointers to data external to the database or contained in data or code external to the database.

Figure 20:
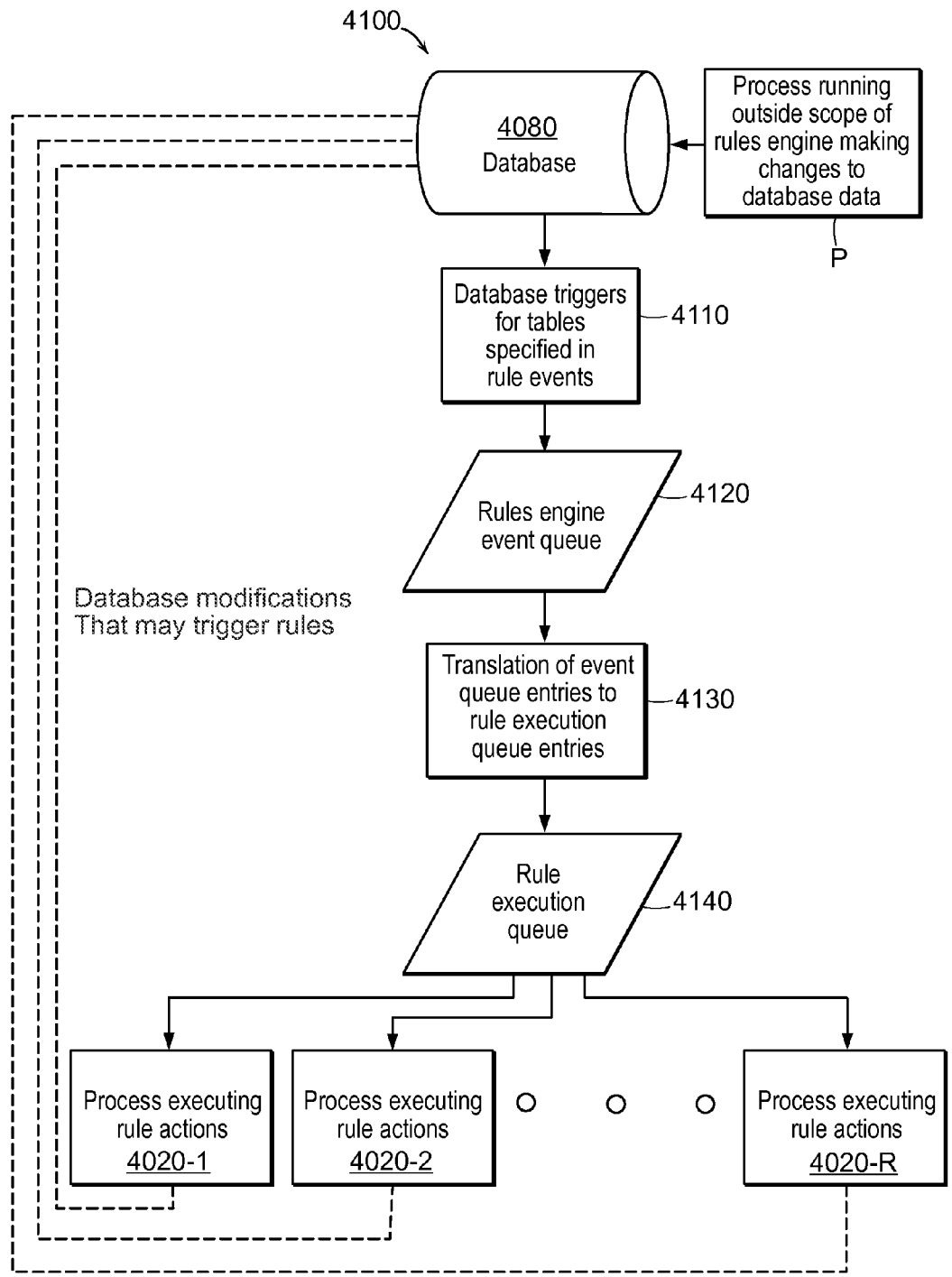
FIG. 20 is a flowchart of a particular rules engine in accordance with particular embodiments of the invention.

FIG. 20 is a flowchart of a particular rules engine in accordance with particular embodiments of the invention. The rules engine 4100 is responsive to database modifications. As shown, a process P running outside the scope of the rules engine 4100 makes a change to data in the ACID database 4080. At step 4110, the database engine triggers an event for a table specified in the rule events 4010 (FIG. 19) and an entry is placed in an event queue 4120. At step 4130, the event queue entries are translated into rule execution queue entries and placed in a rule execution queue 4140.

The entries on the rule execution queue 4140 are processed by processes 4020-1, 4020-2, . . . , 4020-R executing the specified rule action 4020 (FIG. 19). As shown, the processes can run in parallel. The power of the rules engine can be appreciated by the fact that the rule actions can result in modification to the database, which can also trigger further rules.

Figure 21:
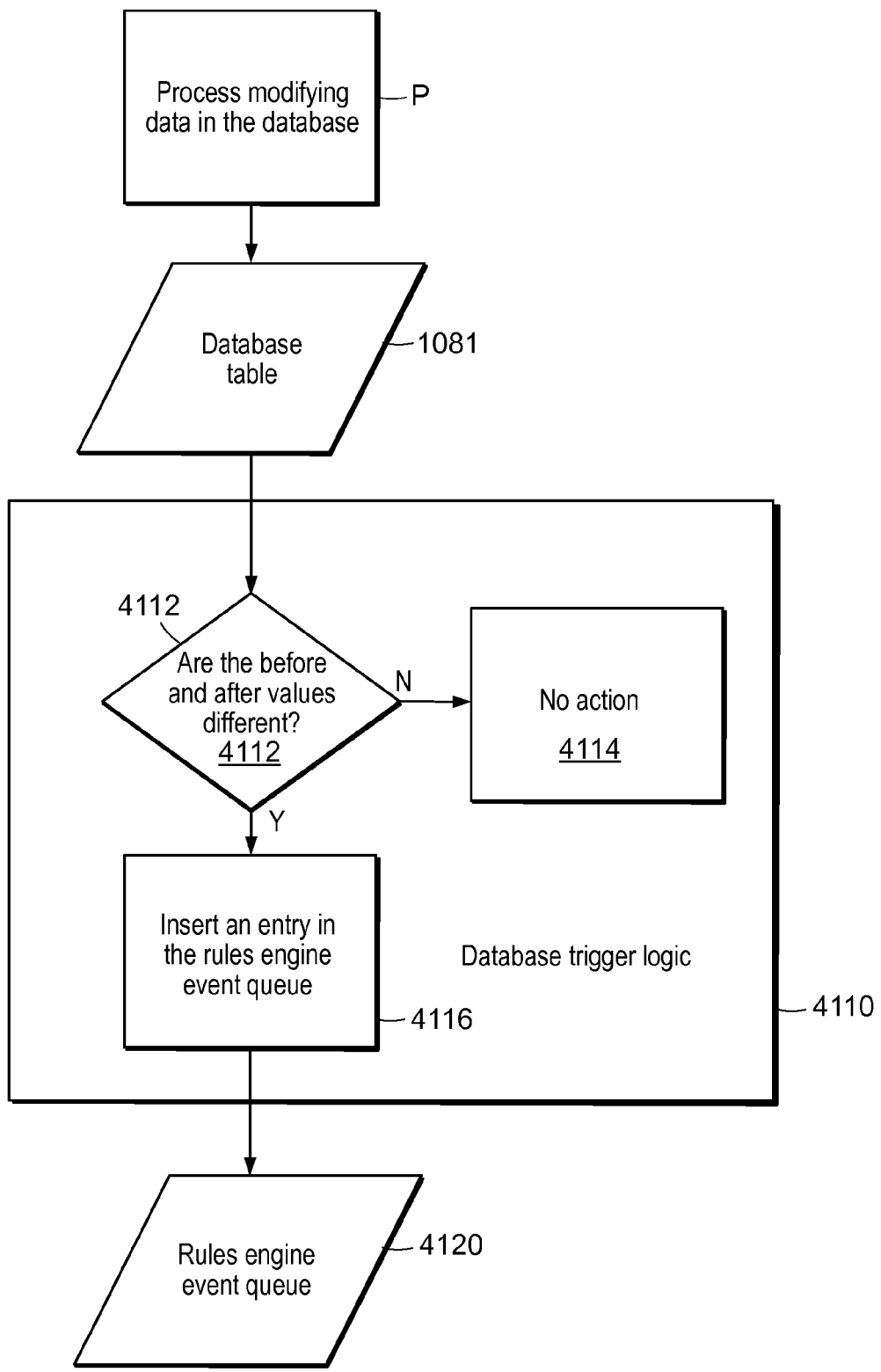
FIG. 21 is a flowchart of rule triggering logic of FIG. 20.

FIG. 21 is a flowchart of rule triggering logic of FIG. 20. Rule triggering 4110 is performed by database triggers attached to the tables that are defined in rule trigger definitions. The database triggers are executed on insert, delete and updates to the tables 1081 by any process P. At step 4112, the triggers examine the before and after contents of all columns named in trigger definitions. If there is no change, then no action is taken at step 4114. But for each column in which the data has changed, the trigger will add an entry at step 4116 to an event queue table 4120, which includes the table name, the column name, the action that caused the change (insert, delete or update), and the primary key values of the database row containing the change.

One advantage of using database triggers is that the process making the change to the data is unaware of the triggering, and that the trigger will capture any modification to the data, no matter how it is made. Finally, the triggering code is run in the context of the transaction of the modifying query and follows the ACID compliant rules. Specifically, if the modifying code fails and the transaction is rolled back, the entry into the event queue will also be rolled back and removed.

Figure 22:
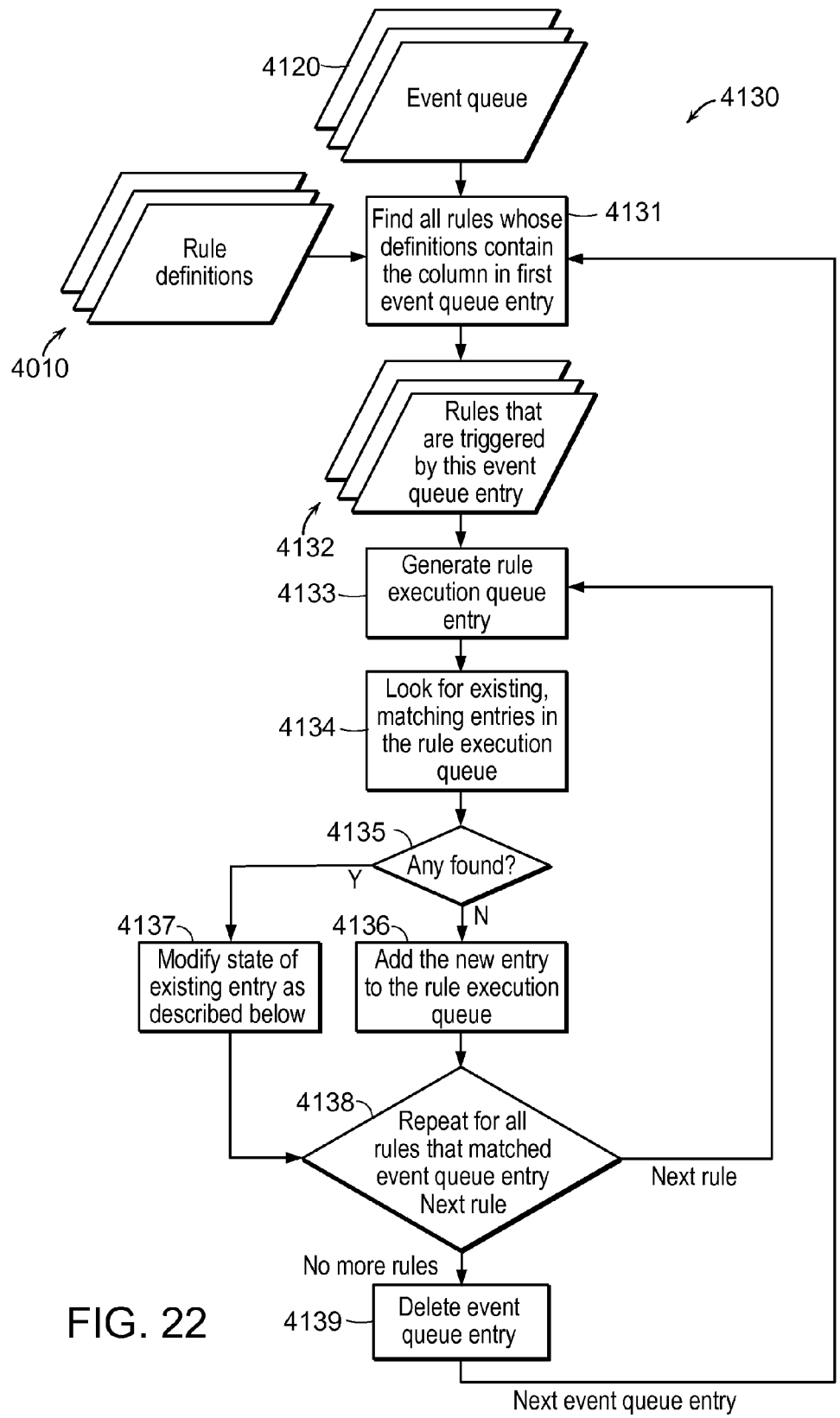
FIG. 22 is a flowchart for translation of event queue entries into rule execution queue entries from FIG. 20.

FIG. 22 is a flowchart for translation of event queue.entries into rule execution queue entries from FIG. 20. The event queue table data 4120 is consumed by a process at step 4131 that reads entries from the queue 4120 and compares the contents of the entry with the event definitions of all rules 4010. At step 4132, for each rule for which the event definition includes the table and column in the queue entry the process performs the following:

At step 4133, a rule execution queue entry is created that includes a rule identifier, the table name, the column name, the primary key values, and the action from the event queue entry.

At step 4134, the process examines the contents of a rule execution queue table. A row in the rule execution queue table includes the identity of a rule, the name of the triggering table, the name of the triggering column, the primary key values of the row that triggered the rule, the action that caused the trigger (insert, delete, or update), the state of the entry, the priority of the rule, and the date and time the row was placed in the queue.

At step 4135, if no entry was found in the rule execution queue that matches the rule identifier, the table name, the column name, the primary key values, and the action from the event queue entry, a new rule execution queue entry is added at step 4136 that includes the identity of the rule, the data from the event queue table, the rule priority and current date and time.

If an entry was found at step 4135, then processing continues to step 4137 where the entry's state is examined and depending on its value, one of the following actions is taken:

If the state is waiting to be run no action is taken.

If the state is failed, no action is taken.

If the state is running, the state is modified to running and waiting to be re-queued.

If the state is running and waiting to be re-queued no action is taken.

At step 4138, if there are more rules that match the event queue entry, then processing returns to step 4133 to process the next rule. Upon completion of these actions the entry in the event queue table is deleted at step 4138 and processing returns to step 4131 to process the next event queue entry. Each event queue entry is handled in a transaction, ensuring that it either completes, and is deleted, or rolled back, and stays in the queue.

Figure 23:
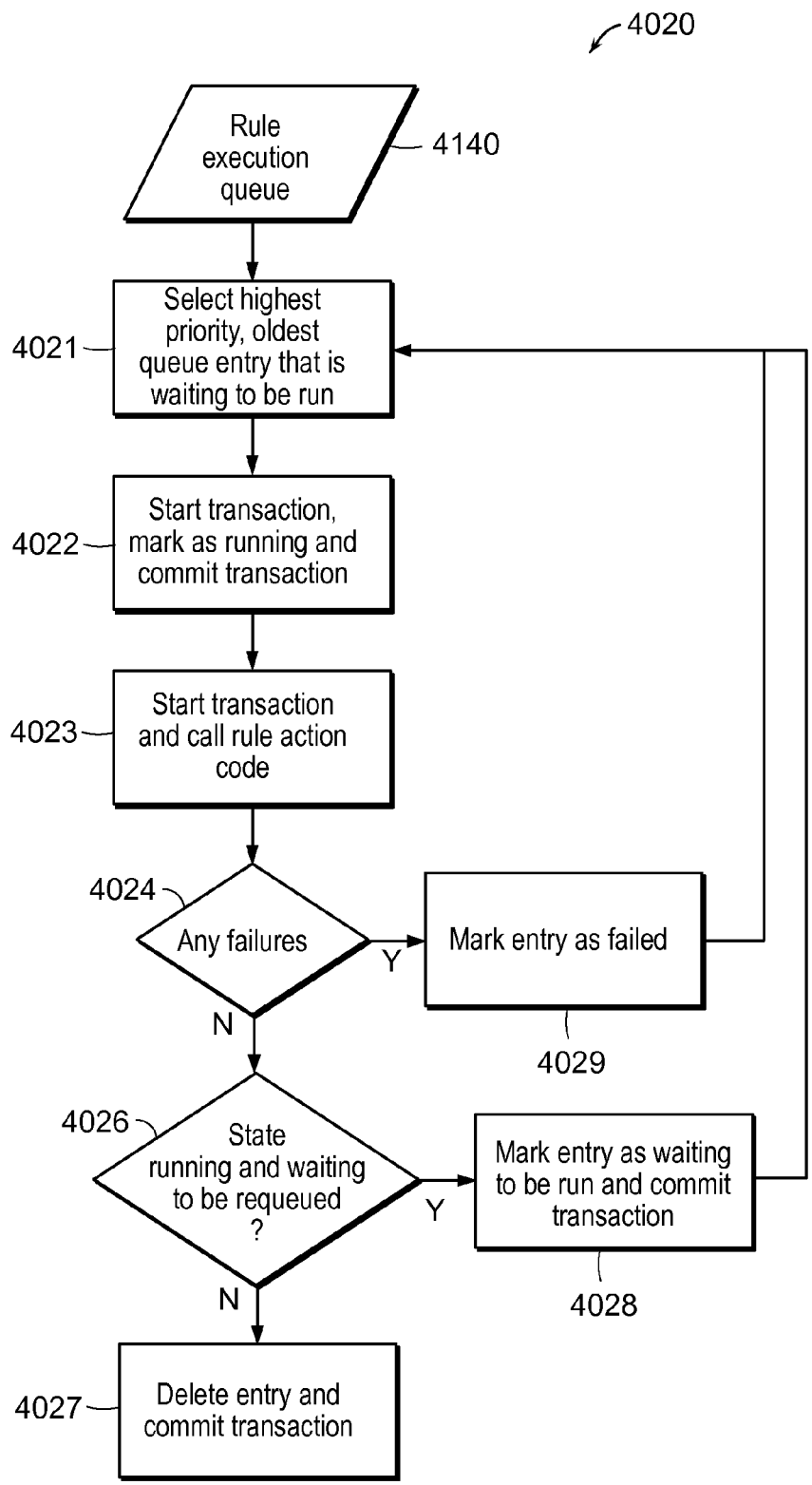
FIG. 23 is a flowchart of rule execution logic of FIG. 20.

FIG. 23 is a flowchart of rule execution logic of FIG. 20. As noted above, execution of rules 4020 can be done in parallel by multiple processes, and can be distributed where execution processes run on multiple servers. Each rule execution process works from the rule execution queue 4140 (FIG. 20) by the rule execution process continually executing the following logic:

Depending on how it is set up, a rule execution process can be configured for a subset of possible priorities. In a single transaction, the highest priority, oldest (defined by the submission date and time) rule execution queue entry that matches the priority configuration of the process, and has a state of waiting to be run is selected at step 4021. At step 4022, its state is changed to running, and the transaction is committed. The code of the rule is then called at step 4023, passing the data from the queue entry as parameters.

If the code returns without failure at step 4024, the queue entry is retrieved again (it may have been modified in the meantime), and its state is examined and the following actions taken based on the state:

If the state is running at step 4026, the queue entry is removed at step 4027.

If the state is running and waiting to be re-queued at step 2046, the state is modified to waiting to run at step 4028.

If the rule code returns a failure at step 4024, the current transaction is committed, a new transaction is started and the queue entry state is modified to failed at step 4029.

The current transaction is then committed to the database.

In addition to the above, database event triggers can be automatically created. By examining the totality of rules the aggregate set of rule-triggering table/column pairs can be ascertained. By maintaining a strict naming convention for the rules engine-generated database triggers the rules engine can automate the management of them. When a rule is created, deleted or modified, the rules engine will generate the source code for the required database triggers. If the database engine provides a facility for examining the source of installed triggers, the engine can compare those required with those installed and delete those no longer required, create new ones required and modify those where the generated source is different from the installed.

Furthermore, rules in a running rules engine can be updated with no disruption by updating the system as follows:
  Stop processing of the event queue.
  Wait until the rule execution queue contains no entries for rules that will be deleted or modified.
  Update the database triggers to conform with the new configuration.
  Update the rule definition table.
  Resume processing of the event queue.

Performance of the rules engine can be increased by caching read-only data. In particular, when there is a high probability that the same data will be executed multiple times in a single process, the performance of the second and subsequent executions can be increased by passing each instance of the rule a pointer to an in-memory data structure that will be passed to all instances running in that process. The first instance may determine that the data structure does not contain the read-only data and read it from the database or some other data source. Subsequent instances may examine the data structure and determine that it contains the read-only data and use the in-memory contents.

The same data structure can be used for instance-to-instance communication within a single process that does not need to be managed transactionally.

Finally, a failed rule instance (where the rule execution queue state is failed) can be restarted by changing the state to waiting to be run after the condition causing the failure has been corrected. The failure correction can include updating the rule logic as described above.

It may be desirable to run the failed rule without changing its initial state for diagnostic purposes, or to validate that the error-causing condition has been corrected. This can be done by running a process (possibly under debugger control) that selects the failed rule from the rule execution queue, but otherwise follows the same logic as described.

If a rule action performs aggregate functions, such as operating across multiple rows, it can be undesirable to have rule instances for each modified row. For example, if a rule calculates the sum of the values of a column across an entire table, the rules engine can place multiple instances of the rule in the rule execution queue, all waiting to be executed. When the first instance executes, the sum will be calculated, and subsequent instances will calculate the same sum and, in effect, do no useful work.

To eliminate that wasted resource use, the particular rules engine allows the rule so specify a piece of code to be executed as the event queue entry is translated to a rule execution queue entry. This code is granted modification access to the rule execution queue entry before the queue is scanned for the same entry. By modifying the entry it can manipulate which existing queue entries it will match. For example, in the previous example, if the field containing the primary key values is modified to a constant value, triggering from different rows will create the same rule execution queue entry and only one instance will exist in the queue at any time.

Figure 24:
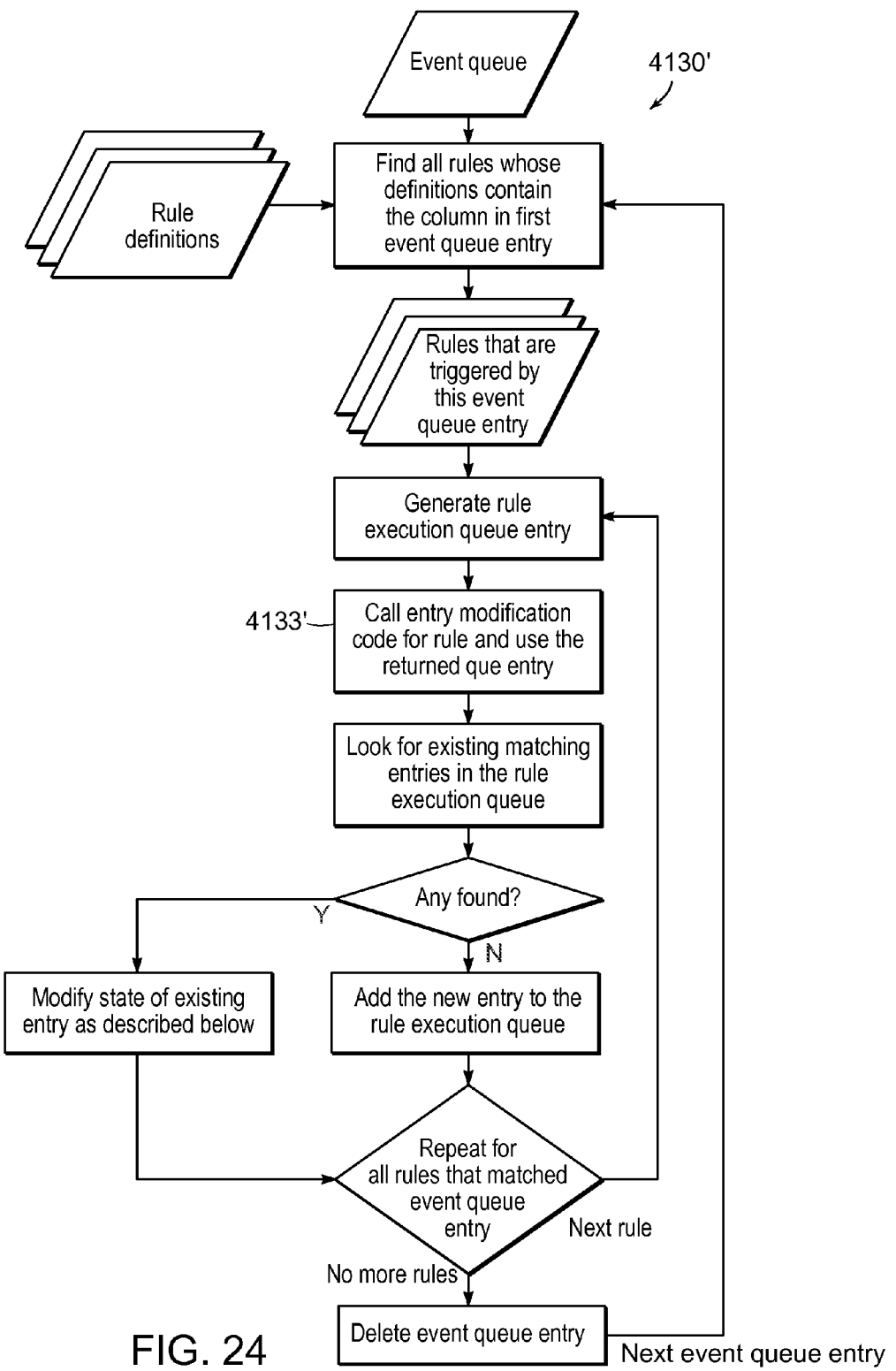
FIG. 24 is a flowchart of a process for translation of event queue entries into rule execution queue entries from FIG. 22 to include queue entry modification.

FIG. 24 is a flowchart of a process for translation of event queue entries into rule execution queue entries from FIG. 22 to include queue entry modification. As shown, the modified translation process 4130' includes the same steps as the translation process 4130 of FIG. 22 except that after step 4133, a call is made at step 4133' to modification code for the rule. In that case, the process continues to step 4134 by using the returned queue entry.

Figure 25:
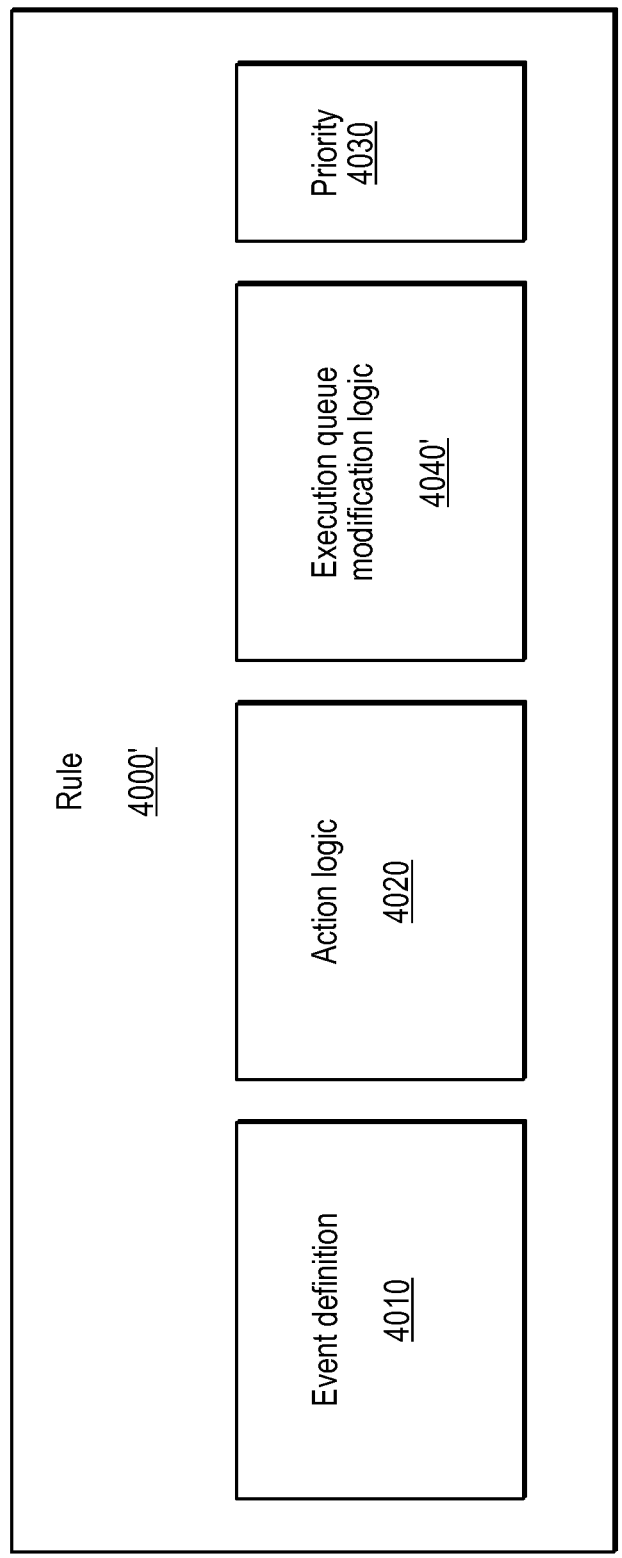
FIG. 25 is a block diagram of rule definition components of FIG. 19 modified to support execution queue entry modification of FIG. 24.

FIG. 25 is a block diagram of rule definition components of FIG. 19 modified to support execution queue entry modification of FIG. 24. The modified rule 4000' includes the event definitions 4010, actions 4020, and priority 4030 components of FIG. 19. As shown, the modified rule 4000' includes execution queue modification logic 4040'.

The ability to manipulate the rule execution queue entry is extremely powerful and useful in a number of other instances.

Finally, the ability to schedule rule actions other than through the previously described database triggers extends the scope of events beyond the modification of database table values. In effect, it allows any piece of software, including rule actions, to raise events and trigger rule execution.

The particular rules engine provides three mechanisms to programmatically trigger rules:
  1. An Application Programming Interface (API) call that adds an event queue entry.
  2. An API call to the event queue to rule execution queue logic with arguments matching the contents of an event queue entry.
  3. An API call to the rule execution queue insertion logic with arguments matching the contents of a rule execution queue entry.

These API entries provide a completely generalized interface for code that programmatically raise events and schedule rule execution.

It is anticipated that the described technologies can be applied to areas beyond facilities management and energy conservation, and that those of ordinary skill in the art will recognize many other application. Some other applications include, but are not limited to:
  Market predictions (stock markets are only one market; we could just as easily predict retail, commodities, political forecasts, etc.)
  Energy rate "surfing" that allows the customer to direct energy consumption based on predicted energy-pricing market behaviors.
  Energy grid management
  Retail spot-advertising (to appear on screens in shopping malls when we predict >X numbers of people of Y demographic will be in Z area. The demographic data can be obtained by:
    Discern the data based on circumstances, such as a movie getting out, time of day, calendar, activities at nearby demographic-specific stores, etc., which form patterns over time.
    Determine the data by associative behavior, such as the reaction to specific adverts in the past or present.
    The people provide the data by registering (social awards, gaming theory, and other incentives)
    The people provide the data by logging in through Google or Facebook.

The people provide the data by reacting to the advert, such as by:
- Logging in to a web site or camera-shooting the geo-location code in the advert for a coupon.
- Shooting the ad as a coupon and walking into a store looking for a discount, where their demographic is recorded for later correlation.
- Pattern recognition cameras (often used in security systems).
- Spotters observe the demographics and record for correlation.
- Medium or long-range budget forecasting for anything related to human patterns or space planning, such as energy budgets, technology budgets, etc.
- Any prediction of a macro environment from a micro environment.

Those of ordinary skill in the art should recognize that methods involved in the automated facilities management system may be embodied in a computer program product that includes a computer-usable medium. For example, such a computer-usable medium can include a readable memory device, such as a solid state memory device, a hard drive device, a CD-ROM, a DVD-ROM, or a computer diskette, having computer-readable program code segments stored thereon. The computer-useable medium can also include a communications or transmission medium, such as a bus or a communications link, whether optical, wired, or wireless, having program code segments carried thereon as digital or analog data signals.

While this invention has been particularly shown and described with references to particular embodiments, it will be understood by those skilled in the art that various changes in form and details may be made to the embodiments without departing from the scope of the invention encompassed by the appended claims.

What is claimed is:

1. An automated computing system, comprising:
a receiver component configured to receive sensor data from plurality of sensors configured to monitor a space in a building;
a database system configured to store the sensor data in an organized structure, and
a rules engine component configured to:
store one or more events in an event queue upon modifications to the stored sensor data,
translate each event in the event queue into an entry in a rules execution queue, wherein each entry in the rules execution queue comprises a priority value and executable data operable to modify a setting associated with a controller in the building based on the stored sensor data; and
a processor configured to process each entry in the rules execution queue according to a rules execution process comprising:
selecting a processing thread from a plurality of processing threads based on the priority value of the respective entry, and
using the selected processing thread to process the executable data of the respective entry.

2. The system of claim 1, wherein the database system includes an ACID-compliant relational database storing the sensor data in tables with data columns.

3. The system of claim 1, wherein the rule comprises a rule definition identifying the sensor data that triggers the rule.

4. The system of claim 3, wherein the rule definition comprises a list of sensor data items that triggers the rule.

5. The system of claim 1, wherein the rule comprises an assigned priority.

6. The system of claim 1, wherein the modification of the setting can succeed or fail and a failed modification is retained and is restartable.

7. An automated computing system, comprising:
a receiver component configured to receive sensor data from a plurality of sensors configured to monitor a space in a building;
a relational database configured to store:
the sensor data in an organized structure of tables having columns of data, and
a plurality of rules, each rule including:
a list of table and column pairs in the relational database that trigger the respective rule;
a priority value; and
an executable action process operable to modify a setting associated with a controller in the building responsive to an event related to the sensor data stored in a table and column from the list of table and column pairs, the action process associated with a subset of the stored sensor data; and
a processor configured to:
trigger storage of one or more of the plurality of rules in a rules execution queue upon an occurrence of a respective event,
for each rule stored in the rules execution queue, distribute the executable action process associated with the respective rule to one of a plurality of processing threads based on the priority value of the respective rule, and
process each executable action process associated with each of the rules stored in the rules execution queue in parallel across the plurality of processing threads.

8. The system of claim 7, wherein the subset of stored sensor data includes data not in the table and column pairs.

9. The system of claim 7, wherein the relational database is ACID compliant.

10. The system of claim 7, wherein the rules execution queue comprises a plurality of respective executable action processes associated with a single rule.

11. The system of claim 10, wherein the plurality of respective executable action processes associated with the single rule are triggered by different table and column pairs.

12. The system of claim 7, wherein the respective action process can succeed or fail and a failed respective action process is retained and is restartable.

13. The system of claim 7, wherein the rules entered in the rules execution queue can be modified.

14. The system of claim 13, wherein any modified rules in the rules execution queue are consolidated.

* * * * *